United States Patent [19]
Yudenfriend et al.

[11] Patent Number: 5,471,609
[45] Date of Patent: Nov. 28, 1995

[54] METHOD FOR IDENTIFYING A SYSTEM HOLDING A 'RESERVE'

[75] Inventors: Harry M. Yudenfriend, Wappingers Falls; David H. Surman, Milton, both of N.Y.; Brent C. Beardsley, Tucson, Ariz.

[73] Assignee: International Business Machines Corporation, Armonk, N.Y.

[21] Appl. No.: 949,282

[22] Filed: Sep. 22, 1992

[51] Int. Cl.⁶ ................................................. G06F 11/34
[52] U.S. Cl. ................ 395/182.02; 395/650; 395/182.08
[58] Field of Search .................................. 395/575, 425; 371/11.2, 11.3; 364/230, 230.3, 230.5, 285

[56] References Cited

U.S. PATENT DOCUMENTS

| | | | |
|---|---|---|---|
| 4,152,764 | 5/1979 | Connors et al. | 364/200 |
| 4,207,609 | 6/1980 | Luiz et al. | 364/200 |
| 4,455,605 | 6/1984 | Cormier et al. | 364/200 |
| 4,472,771 | 9/1984 | Bienvenu et al. | 364/200 |
| 4,674,033 | 6/1987 | Miller | 364/200 |

OTHER PUBLICATIONS

"Alternate Path Group ID Support", Disclosure No. 31964 *Research Disclosure*, Nov. 1990 (copyright Kenneth Mason Publications Ltd., England).

J. C. O'Quin et al., "Takeover Scheme for Control of Shared Disks", *IBM Technical Disclosure Bulletin*, vol. 32, No. 2, Jun. 1989, pp. 378–380.

*Principles of Operation*—IBM System/370 Extended Architecture, IBM Publication SA22–7085–1, Second Edition, Jan. 1987, (copyright 1987, International Business Machines Corp.), pp. 13–1 through 13–9.

D. W. Burt et al., "Contingent Allegiance Enhanced Detection and Reset Function", *IBM Technical Disclosure Bulletin*, vol. 26, No. 3B, Aug. 1983, pp. 1624–1625.

A. S. Merritt, "Testing of Device Reservation State", *IBM Technical Bulletin*, vol. 24, No. 11A, Apr. 1982, pp. 5749–5750.

*Primary Examiner*—Robert W. Beausoliel, Jr.
*Assistant Examiner*—T. Tu
*Attorney, Agent, or Firm*—William A. Kinnaman, Jr.; Peter L. Michaelson; Jeffery J. Brosemer

[57] ABSTRACT

A method and accompanying apparatus for identifying a system, such as illustratively a central processing unit (CPU), that holds a "reserve" for a shared physical device (480, 482, 484) employed within illustratively a multi-processing environment. Specifically, sense data (500) returned by execution of a Reset Allegiance (R/A) command, by a control unit of a shared device, contains the path group identifier (PGID) (300) for a path group (680) through which a reserve has been extended. Inasmuch as the PGID is created in an identical manner for all operating systems (VM or MVS) that share devices through an MVS operating system (600), the PGID advantageously and uniquely specifies the CPU then holding this reserve. The PGID contained in the returned sense data is then translated, through a table look-up operation, in illustratively a so-called IOS Record (1100) situated in a Coupled Dataset (620) for a sysplex installation (455), to yield a common system name of the particular CPU then holding the reserve.

3 Claims, 10 Drawing Sheets

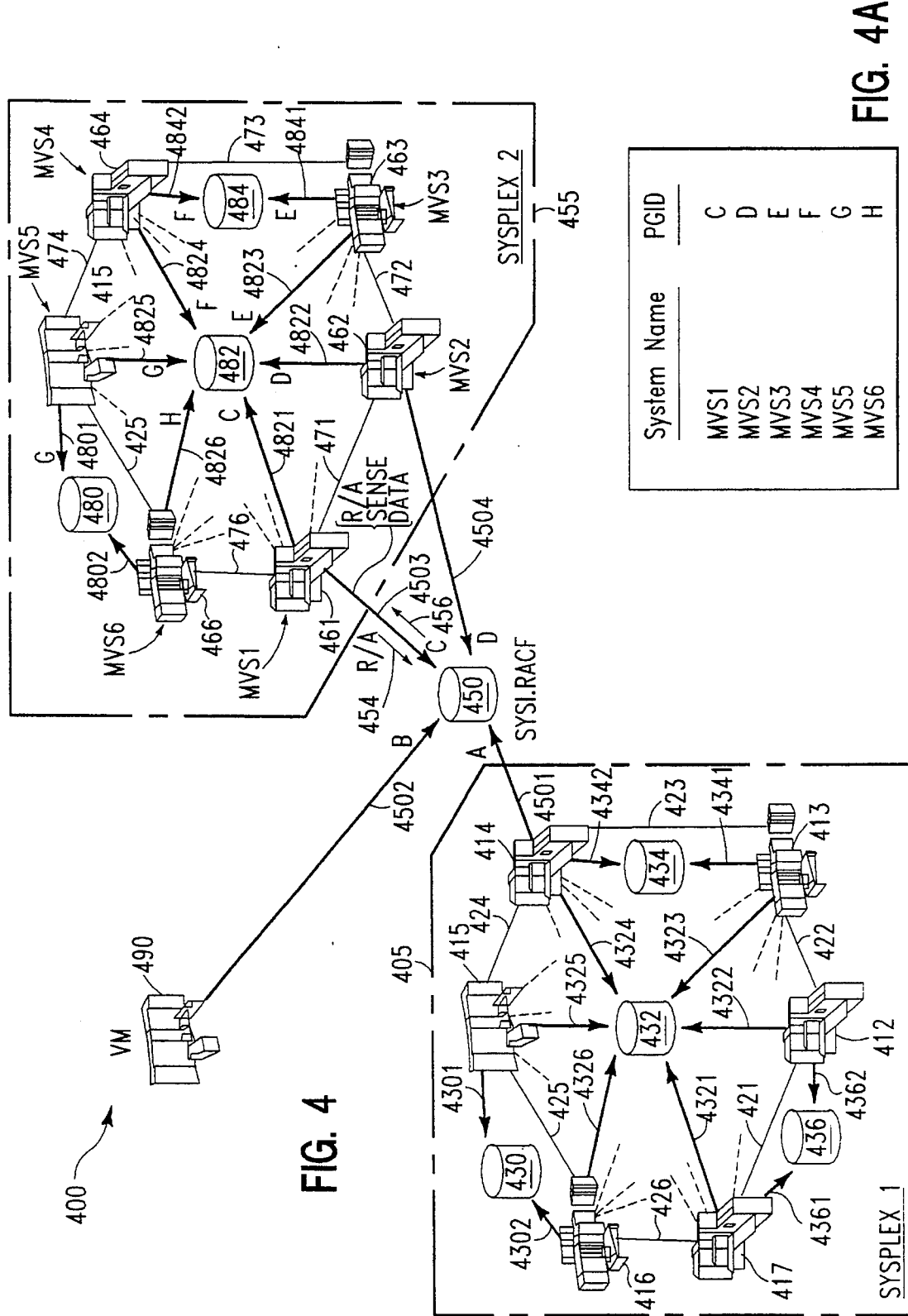

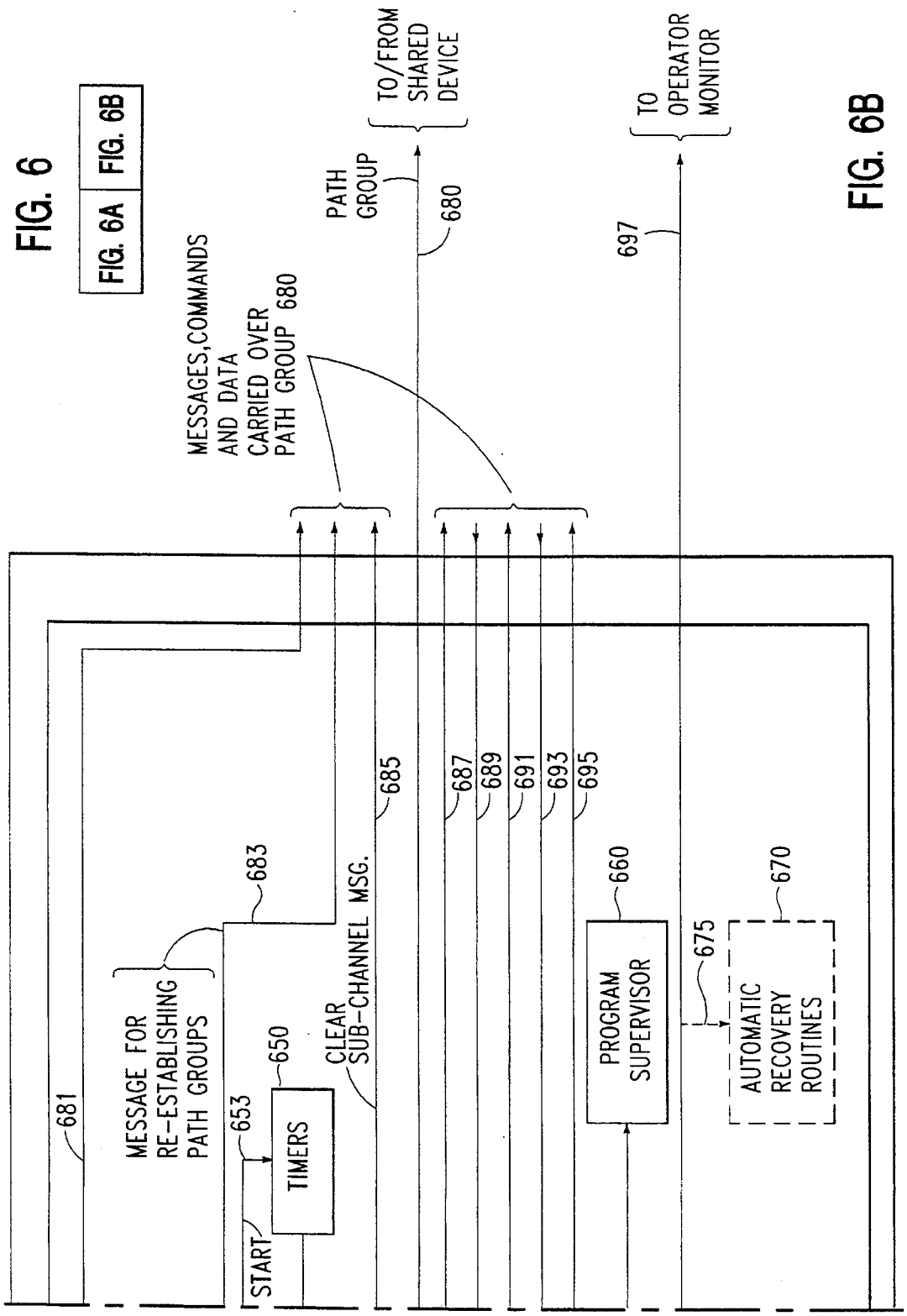

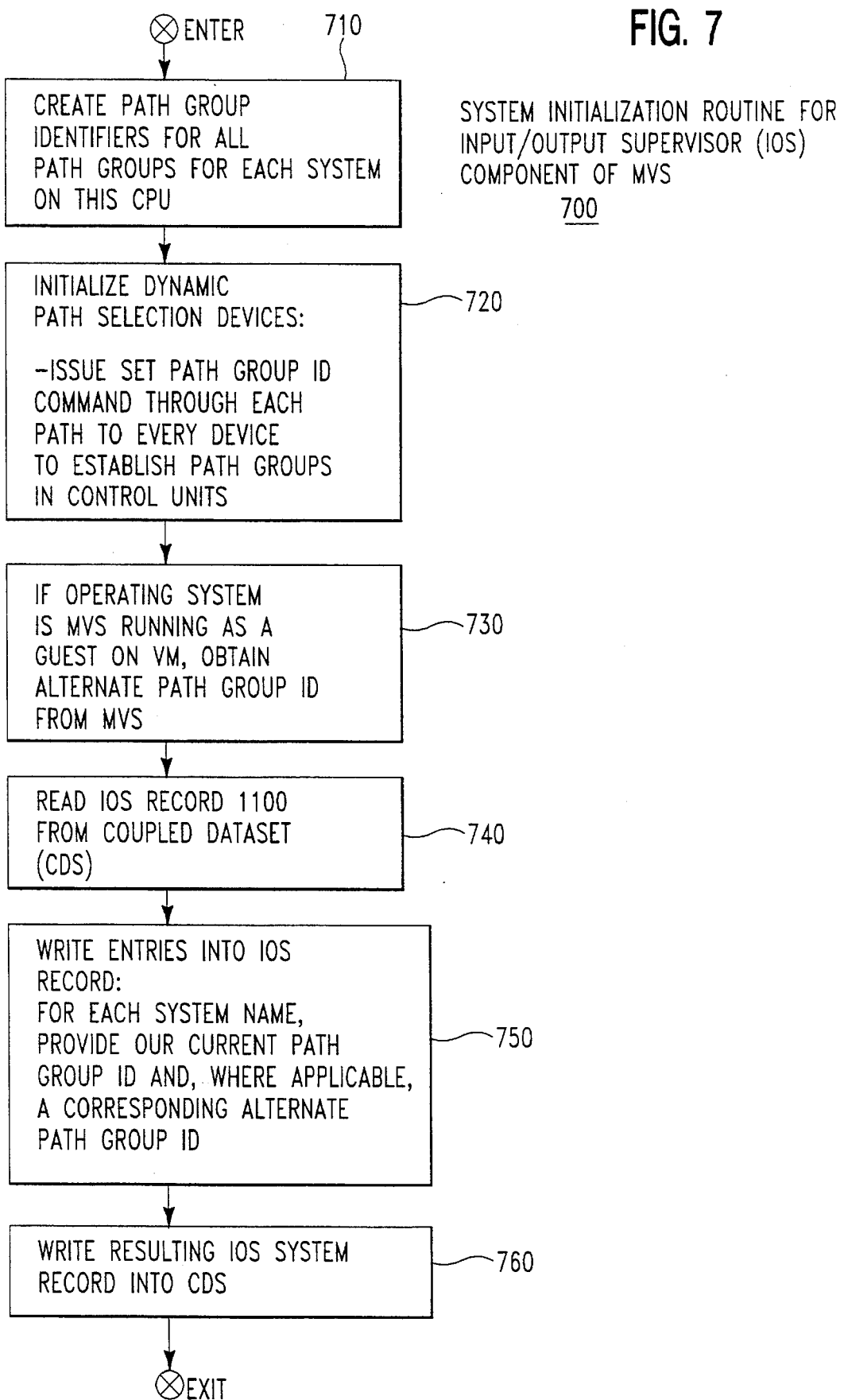

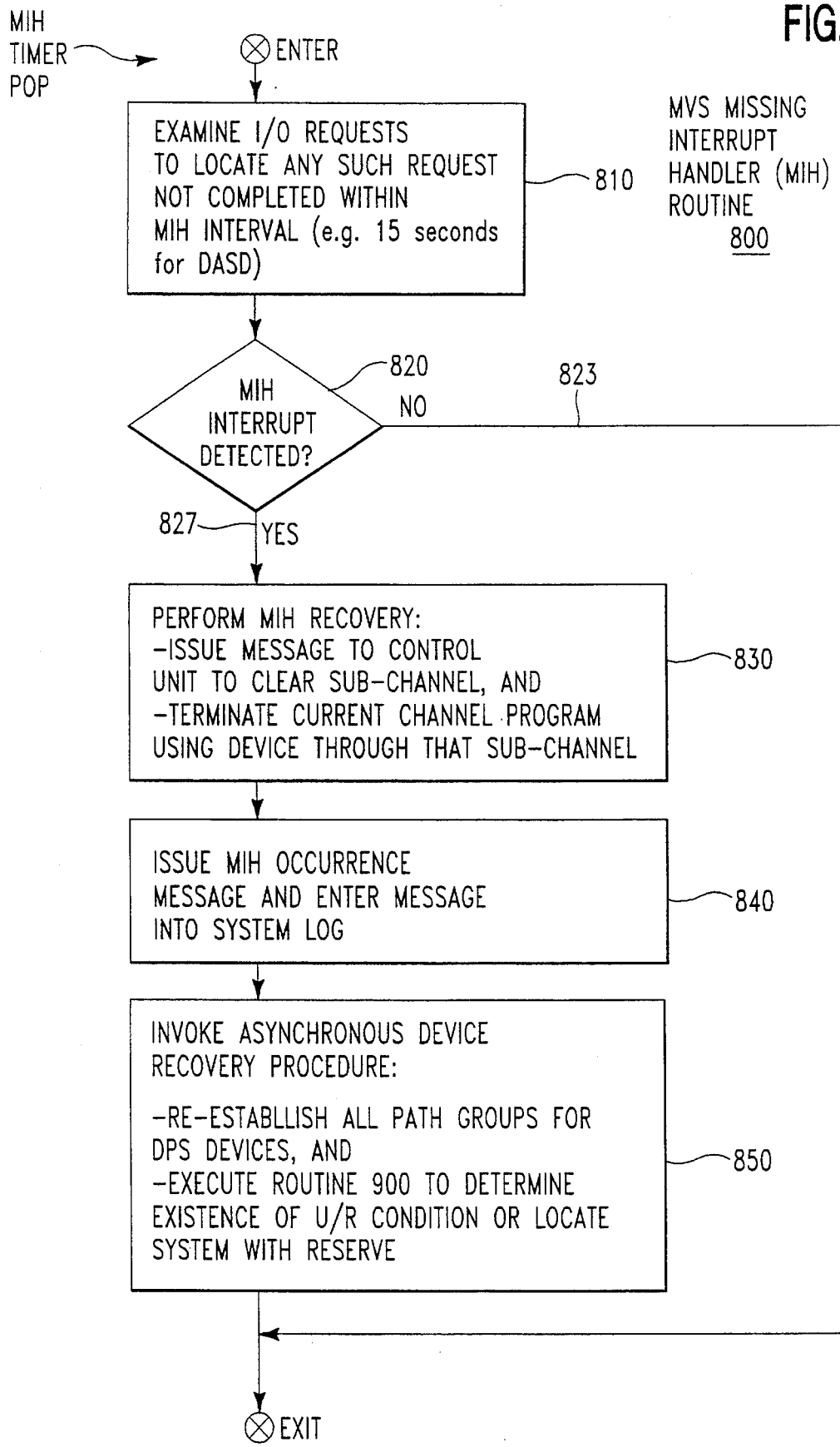

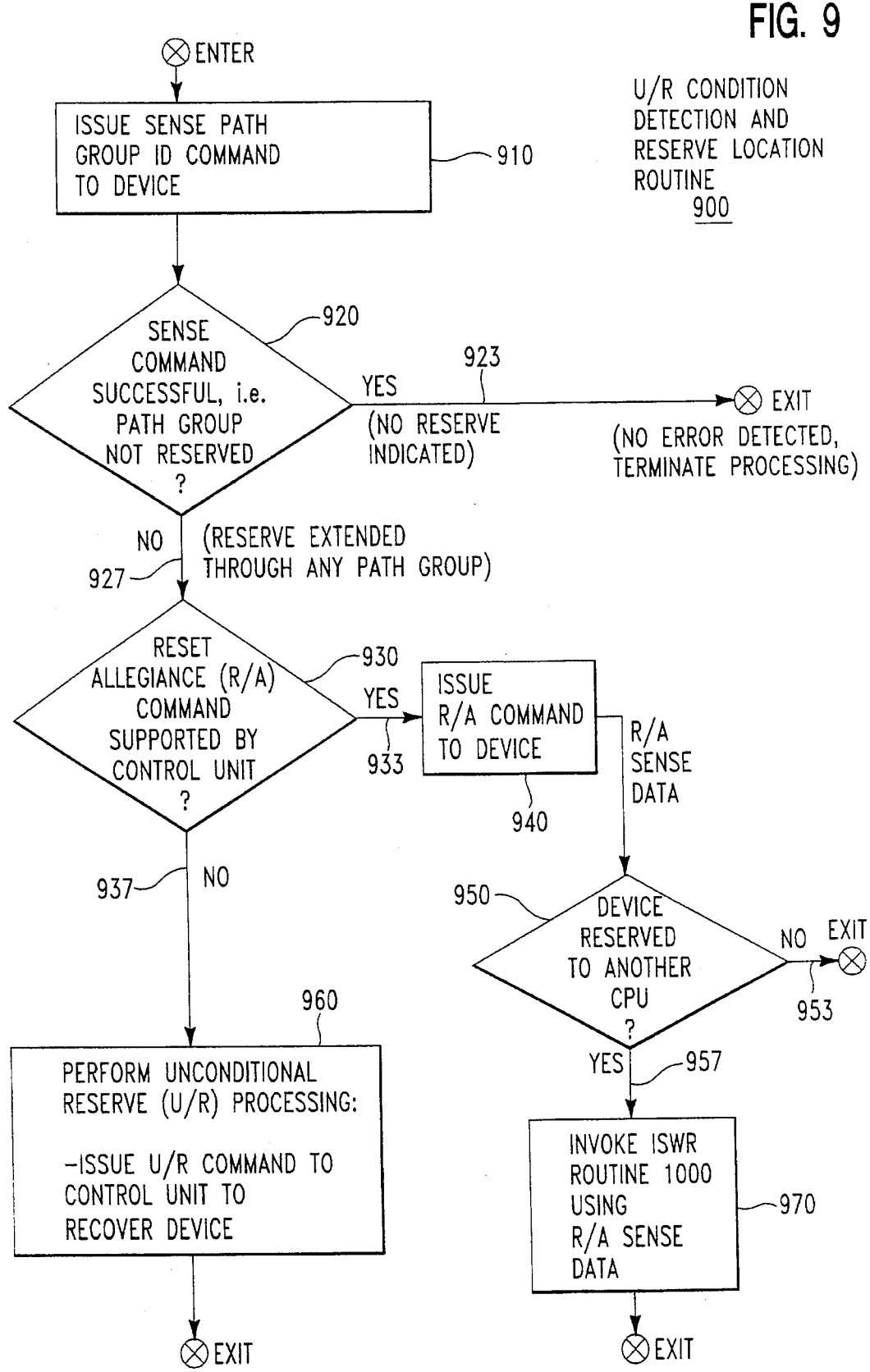

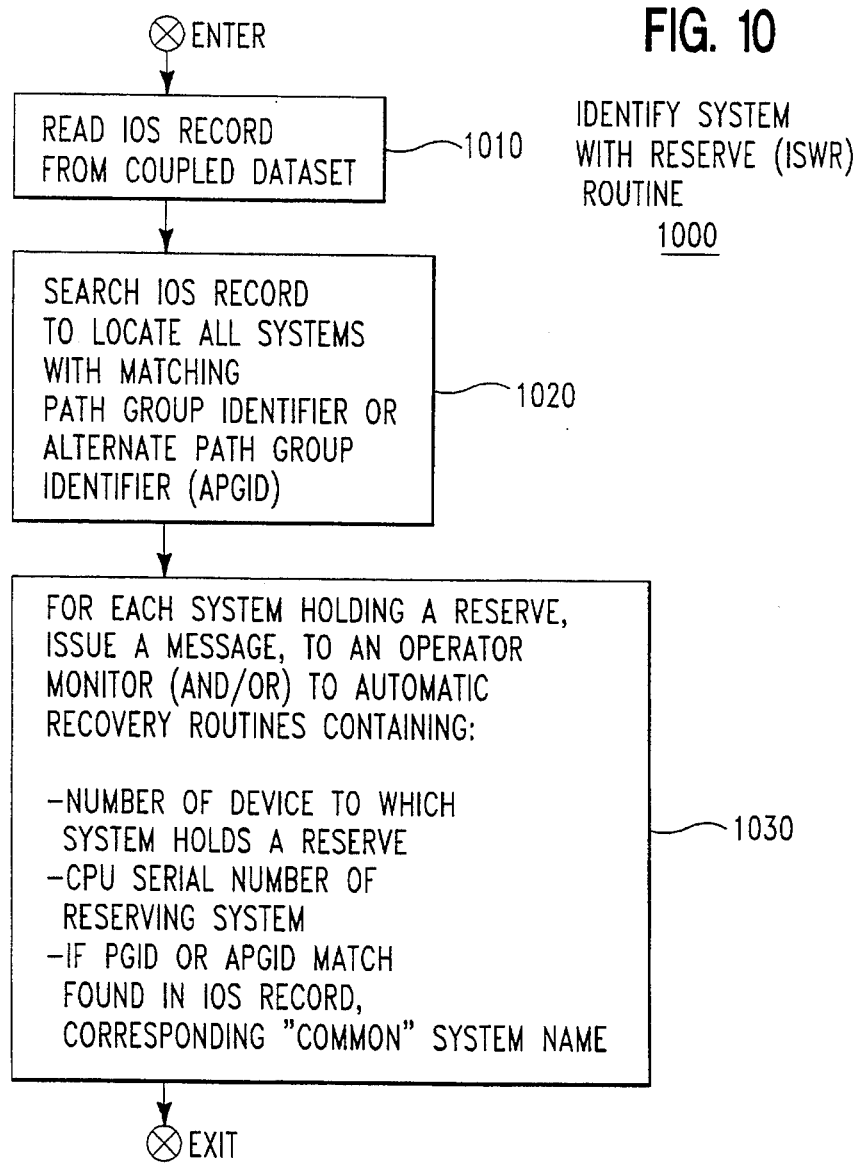

METHOD FOR IDENTIFYING A SYSTEM HOLDING A 'RESERVE'

BACKGROUND OF THE DISCLOSURE

1. Field of the Invention

The invention relates to a method and accompanying apparatus for identifying a system, either hardware and/or software, that holds a "reserve" for a shared physical device employed within illustratively a multi-processing environment.

2. Description of the Prior Art

Present mainframe computer installations generally employ so-called "shared device" architectures. Through these architectures, a group of independently operating systems, such as illustratively a number of individual processing units (processors), share a number of separate physical devices, such as disk drives or peripherals. Such sharing permits all of these processors to utilize, for example, a common peripheral such as a particular input/output (I/O) device, as well as affords each of these processors the ability to gain access to data stored on a common device, such as a direct access storage device (DASD). This, in turn, advantageously lowers the cost of the overall installation by increasing and spreading the utilization of a single device across a number of systems. While these systems often consist of a series of processing units, these systems can be formed of other hardware devices and/or even discrete software processes, such as individual operating systems executing on a common central processing unit (CPU).

In these "shared device" architectures, each device is typically controlled by an individual micro-processor based control unit. A hardware defined communication link (the end-to-end hardware portions of which are commonly referred to as a "path") exists, through a corresponding control unit, between each system (typically a CPU) and a shared device. In essence, a system accesses a shared device over a path. Certain older high end mainframes, such as early System 370 series of computers manufactured by the present assignee, may provide upwards of eight paths for each system. For these particular computers, on the device side of the control unit, the path can take the form of a dedicated physical connection between the control unit and a particular port on the shared device or a particular address on a bus that runs between the control unit and the device. On the system side of the control unit, the path is typically formed of appropriate software messages, e.g. channel control words, carried over a hardware linkage from the system to the control unit. The entire connection from the CPU to the shared device is commonly referred to as a "channel". Each channel is uniquely associated with one shared device, has a unique channel path identifier and has logically separate and distinct facilities for communicating with its attached shared device and the CPU to which that channel is attached. A channel may contain multiple sub-channels, each of which can be used to communicate with a shared device. In this instance, sub-channels are not shared among channels; each sub-channel is associated with only one path. For further details in this regard, the reader is referred to, e.g., page 13-1 of *Principles of Operation—IBM System/370 Extended Architecture*, IBM Publication Number SA22-7085-1, Second Edition, January 1987 (© 1987, International Business Machines Corporation), which is hereinafter referred to as the "System/370 ESA POP" manual. Hence, commands that emanate from each of these systems, e.g. CPUs travel by way of their associated addressed channels to the shared device for execution thereat with responses, if any, to any such system from the device traveling in an opposite direction. The CPU can also logically connect or disconnect a shared device from a path by issuing an appropriate command, over the path, to the control unit associated with that device.

While these physical devices are shared among several different systems, each of these devices is nevertheless constrained to execute only one command at a time. Accordingly, several years ago, the art developed a so-called "Reserve/Release" technique to serialize a device across commands issued by a number of different systems.

In essence, any system, e.g. an operating system executing at one of several CPUs or one of several operating systems executing at one CPU, desiring access to a shared device would issue a "Reserve" command through a given channel linking that system to the device. The Reserve command, when executed by the associated control unit for that channel, would cause that unit to lock out, i.e. inhibit, any other channel (and all other paths used therein) and hence all other systems from gaining access to that device. Consequently, the device would only respond to and execute commands carried over a path that transported the reserve. This would permit the device to execute a string of commands for that particular system and provide resulting data (where appropriate) thereto without interruption or interference from any of the other systems capable of sharing that device. Accordingly, this particular system would be viewed as holding a "Reserve". Execution would continue in this fashion until this particular system issued a "Release" command over the channel, thereby relinquishing its reserve. In response to the Release command, this control unit would then permit any of the systems to once again issue a Reserve command over a corresponding path, hold the reserve and thereby gain sole access to the device, and so on.

To control a channel, a control unit operates according to several pre-defined so-called "allegiance" rules. In essence, these rules collectively require that once a device has been allocated to a program (particularly a so-called "channel" program) running on one system and thus an allegiance has been established between the device and the system, that particular device becomes unavailable to any other such program running on any of the other systems. As such, the "Reserve/Release" commands when issued by the respective systems to obtain, hold and relinquish the reserve, as needed, permit multiple channel programs, to atomically execute multiple I/O operations through a single shared device.

By way of background, allegiances can be of several types, of which "active", "working" and "reserve" allegiances are particularly relevant here. In essence, an "active" allegiance occurs whenever a system is actively communicating through a channel to a device. A "working" allegiance is said to be "extended" from a system to the device, i.e. this allegiance occurs, throughout the time during which active communication is occurring over a channel therebetween (in the case of an "active" allegiance) as well as during the time a command previously received over the channel is pending at the device. In the latter case, the device may be effectively disconnected from the system (so as to allow the system the ability to process other tasks) but will subsequently reconnect through the channel to finish executing the command. An example of the latter case would include a disk drive that is appropriately positioning one of its heads in preparation for executing a data read command and then supplying accessed data to a requesting system. Oftentimes, both "working" and "active" allegiances are commonly and collectively referred to as "implicit" allegiances. A "reserve"

allegiance occurs as soon as a Reserve command is issued by a system to allocate a device to a system and thereby inhibit any other paths from gaining access to that device.

Historically speaking, "Reserve/Release" commands were first implemented such that only the system that issued a Reserve command to allocate a device could issue a Release command to terminate the particular allocation. While this particular "Reserve/Release" technique provided effective serialization of a single shared device among multiple systems, it soon became apparent in the art that a portion of a path, or even an entire channel through a control unit, could malfunction, i.e. fail, in such a manner that if a system had "reserved" a shared device over a path prior to the failure, then an allegiance existed between that system and the device for the duration of the failure. Furthermore, the failure condition itself could even establish an allegiance over a path even though immediately prior thereto no such allegiance existed involving that path. Consequently, the control unit, when faced with the resulting allegiance, totally inhibited any other system from gaining access to that device as long as the failure occurred. Inasmuch as the failure condition on the path precluded the particular system which held the "reserve" from communicating with the shared device, neither that one nor any other of the systems could gain access to the device throughout the duration of this condition. Hence, a symptom of such a failure was a total inability of any of the systems to access the shared device over a prolonged period of time.

In an effort to adequately handle such failures, a "Unconditional Reserve" (U/R) command was implemented in the art. This command, when issued by any system, carried over a path to an associated control unit and executed at that unit, caused that unit to strip all the allegiances from all other such paths involving that unit and establish a reserve allegiance over the specific path which carried the U/R command. As such, this permitted the system which issued the U/R command to gain control of the shared device.

However, since the U/R command could be issued by any system, not just the particular system that held the reserve at the time of a failure, use of this command to restore a shared memory device, particular a DASD, carried a significant risk of violating the integrity of data stored on that device. In particular, if the system that issued the U/R command were the same system that held the reserve and hence the same system that was then updating data stored on the shared device, then that system could simply invoke appropriate data recovery operations and, using both the device and channel program states that existed immediately prior to the failure condition, reinstate data processing through the shared device. Consequently, no loss of data integrity was likely to occur when this system resumed updating stored data. Similarly, if no system was updating data on the device at the time the failure occurred, then any system could issue the U/R command without any loss of data integrity. However, if the shared device was reserved to a different system than the one which issued the U/R command and was updating stored data for the former system, then any data updating operations undertaken by the latter system could well jeopardize the integrity of the stored data. In this instance, the latter system would effectively "steal" the reserve from the former system. However, since the latter system would have no knowledge of the updating operations undertaken by the former system, the latter system could not invoke proper data recovery procedures and thus could well overwrite or otherwise destroy data updates then in process by the former system. In addition, the former system would also be unaware of any updating or recovery operations undertaken by the latter system. Hence, whenever the former system returns to active service, this system could overwrite or otherwise destroy data stored by the latter system.

Consequently, to avoid any such loss of data integrity that resulted from a different system issuing a U/R command and "stealing" the reserve, this system first queried a computer operator as to whether it could issue this command. Before responding to this query, the operator was required to manually: inhibit all "sharing" processes, determine which specific system held the reserve, and then determine and subsequently invoke a proper data recovery procedure, appropriate to that specific system and the processing it was then undertaking, to safeguard against any loss of data integrity. Unfortunately, this manual task placed a significant burden on the operator and, to prevent the device from being allocating to any further applications, also required that all production workload on all the systems, that were not going to issue a U/R command, be terminated for a period of time. The ensuing loss of processing time often resulted in a significant monetary cost to the owner of the computer.

If this command were to be issued but a path that had carried the reserve, i e a "reserved path", had failed, then the U/R command would be issued over a different path to the shared device.

In modern mainframe computers which employ "dynamic pathing" such as the System 370/Extended Architecture (XA) and System 390 series of computers (particularly the System 390 model ES/9000-900 computer) manufactured by the present assignee, use of the U/R command still presented significant difficulties. Specifically, rather than reserving a single path between a system and a device, dynamic pathing (as taught in illustratively U.S. Pat. No. 4,455,605 issued Jun. 19, 1984 to R. L. Cormier et al and owned by the present assignee hereof, and described in, e.g., pages 13-1 through 13-9 of the System/370 ESA POP manual) permitted an entire group of such paths to be reserved (in effect "shared") between each system and a shared device. Hence, in these computers, a system accesses a shared device through a group of paths rather than just through a single path. Each such group carried an 11-byte path group identifier which was established during initialization of the system connected to that group. The corresponding identifier for each path in the group was stored in its associated control unit during execution of a "Set Path Group ID" (SPID) command. To issue this command, each such system first retrieves appropriate hardware data, converts this data into a proper 11-byte path group identifier and then transmits the command containing this identifier down each individual path from the system to the device, thereby forming a path group. The control unit, in turn, which receives this command establishes an internal correspondence between each such path and the path group identifier. Dynamic pathing also provided the ability, through a "Sense Path Group ID" (SNID) command to read the status of any path group given its identifier (ID). In response to a system issuing this command (i.e. the "issuing" system), an associated control unit would return a message providing the identifier of its associated path group and state of that group. The state information simply indicated whether that path group was currently reserved to the issuing system or to another system but, in the latter case, without specifying which other system. As such, the returned message did not specify which particular system then held the reserve. Fortunately, dynamic pathing advantageously reduced the need, in the event of a path failure, to issue a U/R command and move a reserve to a different path. In this regard, if a single path in a group failed, the reserve would simply remain with group and communication would then simply be carried by the next available path in the group. Furthermore, dynamic pathing allowed a shared device to disconnect from one path in a group and reconnect through any other path in the same group without first relinquishing and then re-establishing a reserve; however the need to issue a U/R command in dynamic pathing environments still existed, as described below.

Moreover, the systems in such modern mainframe computers can be configured, at least ideally, to extend sharing among a large number of path groups to an extremely large number of devices. Each of these systems typically utilizes a timer(s), operating through a so-called missing interrupt handler (MIH), to produce an interrupt (generally referred to as a "'start pending' missing interrupt" or simply an "MIH interrupt") to detect a failure, such as in any shared device or path group, which would likely necessitate the issuance of a U/R command. In this regard, a timer would be started once a command involving a shared device was invoked. The timer would either time out and generate an MIH interrupt once a default interval, typically 15 seconds, occurred or would be reset upon successful completion of the command, whichever came first. Each system unit periodically tested for the occurrence of this interrupt as a symptom of a failure condition in a path group or shared device.

Unfortunately, in these modern computers, a reserve could still be stolen as the result of a system issuing a U/R command, thereby once again jeopardizing data integrity. Although the Sense Path Group ID command could be issued in response to an MIH interrupt, doing so did not identify the specific system that held the reserve. Therefore, before permitting any system to issue the U/R command, the computer operator was once again constrained to: inhibit sharing throughout the entire computer, quiesce those systems which were not going to issue a U/R command, then manually query each such system in succession (by having its status displayed on a monitor at an operator console) to determine which particular system held the reserve. Once the reserve was located, the operator could determine proper corrective action, e.g. a data recovery procedure, appropriate to this system and subsequently invoke this action. While an underlying failure condition rarely occurred, nevertheless, when it did occur, the relatively large number of systems used in the computer necessitated that, to manually query each and every system, the entire computer had to be quiesced for a rather prolonged period of time. In large computer installations, this downtime tended to be extremely costly.

Therefore, a need existed in the art to greatly reduce the downtime of an entire computer installation that, in the event of a failure condition, would be required to locate a particular system holding a reserve, take appropriate corrective action and then return the device to active service.

Furthermore, an additional complication was seen to arise in that a series of MIH interrupts could occur in the absence of a failure condition, and greatly annoy the computer operator as well as cause that operator to falsely issue a series of U/R commands and jeopardize data integrity. In these situations, a device could simply be reserved for a prolonged period of time, such as illustratively during a very long data updating operation. Issuing the U/R command and "stealing" the reserve in this situation would likely jeopardize any data then being updated through the shared device. Additionally, the occurrence of one such interrupt would simply reset the associated timer which, if the device were reserved for, e.g., several minutes, would simply cause another such interrupt to be generated, and so on for as long as the device was reserved. Each such successive interrupt would require the operator to determine whether a corresponding U/R command should be issued. However, since no allegiances then needed to be reset, any U/R command that was otherwise issued during this time would simply be unnecessary and needlessly consume effort by the operator as well as jeopardize data integrity. Therefore, in an attempt to significantly reduce the number of falsely issued U/R commands, the MVS operating system was modified to automatically issue the SNID command for any path group and determine the state of that group regardless of whether that group was then reserved or not and regardless of which system then held the reserve. If the group was reserved, then issuance of this command indicated that: (a) no failure occurred but the reserve was held for a relatively long period of time, (b) the failure will be recovered by the system then holding the reserve, or (c) the failure occurred by a system that was then unknown. Accordingly, the U/R command would not be issued and no corrective action would be invoked through the requesting system. However, if the path group was not reserved anywhere as indicated by the sense data returned by the SNID command, a reserve could still be extended through that group even after this sense data was returned. Hence, in these instances, operator intervention was still required to quiesce those systems which were not going to issue a U/R command and then manually query each system to locate any one then holding the reserve and the system which failed.

While use of the Sense Path Group ID command greatly reduced the likelihood that the operator would falsely issue a U/R command, the operator was still burdened with the task of determining, through manually querying the affected systems, whether a U/R command should be issued.

Recently, in an attempt to once again reduce operator intervention, another command, i.e. the "Reset Allegiance" (R/A) command, was introduced. In particular, this command, when issued by a system and executed by a control unit, caused that unit to reset a working allegiance that had been established for the shared device. This command, when executed by the control unit, also returns a 32 byte result to the system. Hence, if an MIH interrupt occurred, thereby indicating a failure condition exists in a path group or shared device, then this command could be automatically used by that particular system that issued the SNID command to successfully free the path group or shared device from its working allegiance. To prevent this command from stealing a reserve, the R/A command does not function whenever a reserve allegiance has been established. In this instance, use of the Reset Allegiance command merely returns a 32 byte result which: (a) specifies that a path group or shared device is reserved, and (b) includes a bit that simply indicates whether the path group or shared device is reserved to either the system which issued the command or to another system but without specifically identifying the latter system. Consequently, if an MIH interrupt occurs while any system, other than the one which issued the R/A command, holds a reserve, the operator is still generally burdened with the onerous task of manually interrogating each system (or path) to locate the specific system then holding the reserve and thereafter effectuate proper corrective action.

Accordingly, a need still exists in the art for a technique (apparatus and an accompanying method) for use in illustratively a multi-processing environment to significantly minimize, if not totally eliminate, the need, as a result of a failure condition, for an operator to manually query each system in the environment to determine which system currently holds a reserve. Moreover, owing to the ability of the "Enterprise System Connection" (ESCON) architecture, developed by the present assignee, to extend device sharing over a larger number of systems (and thus provide enhanced connectivity) as had heretofore been permitted with the so-called Original Equipment Manufacturers Interface (OEMI), as essentially described above, this need for such a technique is becoming particularly acute. Advantageously, such a technique could then be used to automatically trigger proper corrective action with concomitantly substantial reductions occurring in installation downtime and operator intervention and hence in lost processing costs.

SUMMARY OF THE INVENTION

Through our present invention, we have advantageously overcome the deficiencies in the art by substantially, if not completely, eliminating the need to have an operator manually interrogate each system to locate the reserve in the event of a failure condition.

We accomplish this result by changing the sense data returned by execution of the Reset Allegiance (R/A) command to include the path group identifier (PGID) for the path group then holding the reserve. Each such PGID contains a unique identification of the CPU to which it is connected and through which that CPU can extend a reserve. Advantageously, PGIDs are generated in an identical manner for all operating systems, e.g. MVS and VM operating systems, that share devices through the MVS operating system. Thus, the PGID for each such group is guaranteed to be substantially unique throughout the world. Hence, regardless of how many path groups a computer installation employs or the number of installations using dynamic pathing and existing throughout the world, and regardless of whether any of these installations are interconnected to each other or not, the resulting PGID contained in the sense data returned by the R/A command at any one installation, in all likelihood, will point to only one specific path group in the world. Accordingly, a message containing CPU identification data supplied by the PGID is then generated to an operator for display at an appropriate monitor to unambiguously define a CPU (or multiple guest MVS operating systems executing on a host VM system at any one such CPU, as described below) then connected to a single path group and which is currently holding the reserve. This message can also be used to trigger an automatic recovery routine(s) appropriate to the one specific system, e.g. an operating system on a CPU, then holding the reserve.

Furthermore by incorporating our invention into a sysplex (i.e. a number of interconnected computer systems communicating through a cross system coupling facility, "XCF"), our invention provides a feature of relieving the sysplex operator of substantially any need to manually convert the CPU identification data, contained in the R/A sense data, into a common system name. In particular, the path group identifier contained in the R/A sense data is translated, through a table look-up operation into an IOS (I/O Supervisor) Record located in a so-called "Coupled Dataset", into a common system, i.e. "installation", name easily recognized by the operator. This dataset is maintained by the XCF and contains identification and other information regarding the state of each individual system in the sysplex and its interconnection with other such systems.

In particular, the IOS record itself contains a table of all path group identifiers along with the common system name of each system in the sysplex to which each path group is connected. The Coupled Dataset is shared among and accessible, via the XCF, to any system within the sysplex. Consequently, any system in the sysplex which receives a path group identifier returned by the R/A command, then accesses the IOS record to determine the associated common system name. This common system name, where available, is then advantageously included in the message generated to the operator and/or used to trigger the appropriate automatic recovery routine(s).

An additional feature of our invention lies in its ability to readily handle guest MVS operating system(s) that execute on top of a host VM operating system. In this instance, both the VM and MVS operating systems will each assign a path group identifier, typically different values and created through the same algorithm, to a common path group. By including both of these identifiers (where available), as a "primary" PGID and an "alternate" PGID, into a common entry for a corresponding system(s) in the IOS Record and searching this record to obtain a match in either identifier, then the particular system which is then holding the reserve can be readily located, regardless of whether that system is the VM or MVS operating system executing on a given CPU.

BRIEF DESCRIPTION OF THE DRAWINGS

The teachings of our present invention can be readily understood by considering the following detailed description in conjunction with the accompanying drawings, in which:

FIG. 4 shows a simplified high level block diagram of illustratively a two sysplex multi-processing computer installation that utilizes a common shared device between the sysplexes and which could incorporate our present invention;

FIG. 4A provides a table specifying a corresponding PGID for each CPU within sysplex 455 shown in FIG. 4;

FIG. 6 shows the proper alignment of the drawing sheets for FIGS. 6A and 6B;

FIGS. 6A and 6B collectively and diagrammatically show information flow that occurs among various software components used in implementing a preferred embodiment of our present invention and which execute within an MVS operating system associated with illustratively CPU 461 depicted in FIG. 4;

FIG. 7 shows a high level flowchart of routine 700, depicted in FIGS. 6A and 6B, for performing system initialization of an Input/output (I/O) Supervisor component of the MVS operating system;

FIG. 8 shows a high level flowchart of MVS Missing Interrupt Handler routine 800, also depicted in FIGS. 6A and

Figure 6A:
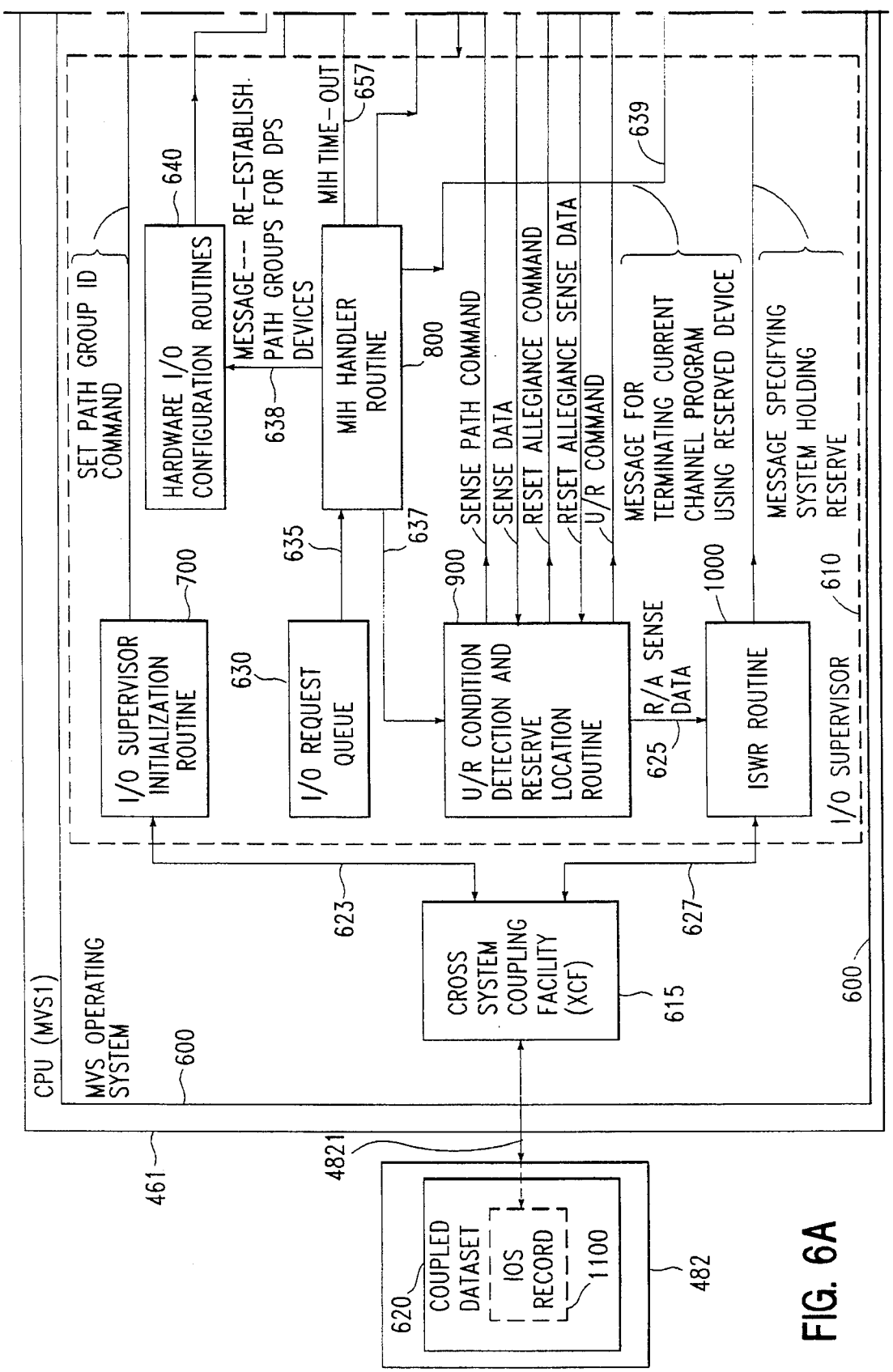

6B;

FIG. 9 shows a high level flowchart of Unconditional Reserve (U/R) Condition Detection and Reserve Location routine 900, also depicted in FIGS. 6A and 6B;

FIG. 10 shows high level flowchart of Identify System with Reserve (ISWR) routine 1000, also depicted in FIGS. 6A and 6B; and FIG. 11 diagrammatically shows illustrative contents, in tabular form, of IOS record 1100 contained within Coupled Dataset 620 also depicted in FIGS. 6A and 6B.

To facilitate understanding, identical reference numerals have been used, where possible, to designate identical elements that are common to various figures.

DETAILED DESCRIPTION

After considering the following description, those skilled in the art will clearly realize that the teachings of our invention can be readily utilized in a wide variety of multi-processing or similar environments through which a number of separate processing units, whether operating autonomously or not, access a common shared device using a "Reserve/Release" or similar technique. Of course, these units need not be processors but can be nearly any operative unit, such as for example an input channel on a data measurement and acquisition system, that requires access to a shared device, such as a memory device. Moreover, the device, while generally being a shared physical device, such as a peripheral, storage or input/output (I/O) device, is not so limited and can even encompass a shared software process to which access is gained through the Reserve/Release or a similar functioning technique (which, for simplicity, will all be collectively and generically referred to hereinafter as the "Reserve/Release" technique). Nevertheless, for purposes of illustration and to simplify the following discussion, our present invention will be specifically discussed in the context of use in conjunction with a simplified dynamic pathing multi-processing environment of the type present within a Series/370 Extended Architecture (XA) or System 390 computer, as currently manufactured by the International Business Machines Corporation ("IBM"), and a shared direct access storage device (DASD) frequently used on such a computer.

A. Background

Figure 1:
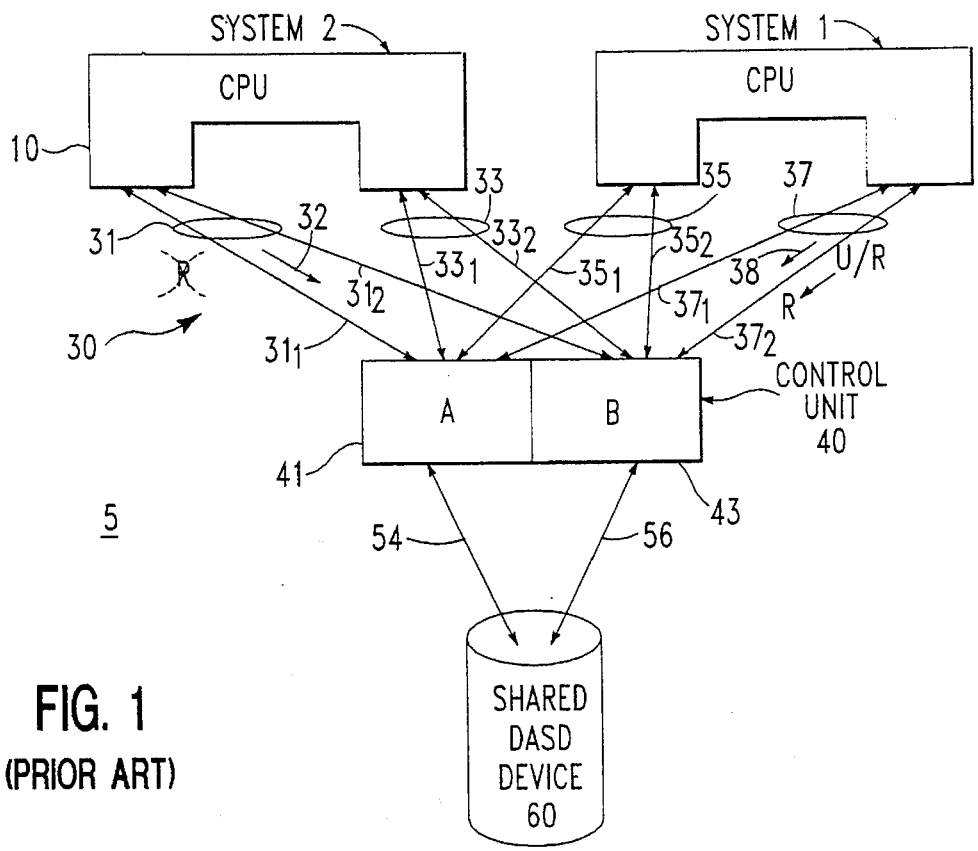
FIG. 1 shows a simplified high level block diagram of a conventional multi-processor computer installation that utilizes a shared device and dynamic pathing.

FIG. 1 shows a simplified high level block diagram of conventional multi-processor computer installation 5 that utilizes a shared device and dynamic pathing. As shown, installation 5 contains two independent central processing units (CPU) 10 and 20 (also denoted here as System 1 and System 2), control unit 40 and shared device 60. This device is illustratively a DASD typified by models 3380 and 3390 currently manufactured by IBM. In addition, the control unit is preferably a model 3990 control unit also currently manufactured by IBM. Each of the processors gains access to device 60 through an input/output system, here comprised of physical paths 30 and control unit 40, commonly referred to as a "channel subsystem".

Paths 30 are themselves comprised of path group 31, which illustratively contains two physical paths (hereinafter referred to as "channel paths") $31_1$ and $31_2$; and path groups 33, 35 and 37 each of which respectively contains two channel paths $33_1$ and $33_2$; $35_1$ and $35_2$ and $37_1$, and $37_2$. In essence, rather than connecting each CPU through a single channel path to a control unit, dynamic pathing, to the extent relevant here, connects each CPU through a group of channel paths all having a common identifier to the control unit associated with the shared device. Each channel path within any path group is connected and dedicated to a different subchannel extending through a control unit. Channel paths are not shared. In this regard, channel paths $31_1$ and $31_2$ are connected to storage directors 41 and 43 (also denoted as storage directors A and B, respectively) in control unit 40. Each of storage directors 41 and 43 is extended through the control unit, via a corresponding one of two redundant physical links 54 and 56, respectively, to shared DASD device 60. Though for simplicity, only two path groups are shown with each path group containing only two channel paths, in actuality, depending upon the number of separate systems and shared devices, a path group can contain a large number separate channel paths for connection to an extremely large number of devices. The end-to-end hardware communication link that encompasses each of these physical paths along with a corresponding subchannel through a control unit connected thereto to the shared device is also collectively referred to as a "subchannel". In this regard, path group 31 (and similarly for the other path groups shown) extends through control unit 40 to provide two distinct subchannels, each of which carries a common address, to shared device 60.

In essence, control unit 40 accepts commands from CPUs 10 and 20, controls the timing of data transfer over each channel path and provides indications concerning the status of shared device 60. Though control unit 40 is depicted as being separate from shared device 60, this unit can be physically and logically integrated with the shared device. Generally speaking, in the case of most electro-mechanical devices, such as a disk drive, and owing to differences in the type of equipment which the control unit and the device require, a well defined interface (not explicitly shown) exists between the device and the control unit. These devices, such as those appearing in illustratively IBM 3380 and 3390 DASDs, are generally of a type where only one device of a group, such as one head on a multi-platter disk drive, attached to a control unit is required to transfer data at a time; with the entire control unit being shared among a number of such devices. Thus, a single DASD, depending upon its size, may provide quite a number of several such devices; however, to simplify the drawing and the accompanying the discussion, only one such device 60 on a shared DASD is specifically shown. Currently, a device may accommodate up to eight different subchannels, though, as discussed below, only one such subchannel will be active at any one time. In some other electronic I/O devices, such as a channel-to-channel adapter (not relevant here), the control unit does not have an identity of its own. The control unit will be discussed in greater detail only to the extent of its relevance to the present invention.

Each path group carries a unique hardware defined (11 byte) path group identifier which is established during system initialization (which will be discussed in detail below in conjunction with FIG. 3) and stored within the associated control units connected to all the channel paths in the group. The corresponding identifier for each path in a group is loaded into its associated control unit during its execution of a "Set Path Group ID" command issued by each CPU. This command is issued by that CPU while it is initializing the I/O Supervisor component of its MVS operating system (both of which are not specifically shown in this figure, but will be discussed below in conjunction with FIGS. 6A and 6B). To issue this command, each such system, such as CPU 10 shown in FIG. 1, first retrieves a hardware defined path group identification value from its internal system memory and, through the I/O Supervisor, transmits the command with this identifier down each individual path in the group. The control unit, in turn, which receives this command establishes an internal correspondence, in its local memory, between each such path and the path group identifier. As such, the occurrence of the same path group identifier on each of several paths defines those particular paths that are to form that specific group, and so on for each such group. For further details on dynamic pathing, the reader is directed to illustratively U.S. Pat. No. 4,455,605 issued Jun. 19, 1984 to R. L. Cormier et al and owned by the present assignee hereof, and *Principles of Operation— IBM System/370 Extended Architecture*, IBM Publication Number SA22-7085-1, Second Edition, January 1987, pages 13-1 through 13-9. In those situations (not shown in FIG. 1) where a common CPU is connected through separate path groups to each of a series of separate devices, each of these path groups carries the same path group identification value.

To serialize operation of a shared device, such as a DASD of which only one such device, i.e. device 60, is shown for simplification, across programs executing on either CPU, an operating system, such as the MVS operating system developed and distributed by IBM, employed within each CPU uses a so-called "Reserve/Release" technique to permit each such program to gain atomistic access to the device. Essentially, through this technique, when used with dynamic path groups, System 1 or System 2, whichever is requesting access to device 60 at any given time, would issued a "Reserve" command (denoted as "R") through a given path group to the device, such as, e.g., CPU 10 would issue this command (as symbolized by arrow 32) over path group 31. The system that desires access can issue this command over any subchannel in the group and hence any channel path used therein. This command, when executed by the control unit, specifically via storage directors 41 therein, which received the command, would cause this control unit to lock out, i.e. inhibit, any other subchannel (and all other channel paths connected thereto) and hence all other systems from gaining access to that device. Consequently, device 60 would only respond to and execute commands carried over the path group, e.g. group 31, that transported the reserve command and from the system, here CPU 10, which successfully issued the reserve command. This would permit device 60 to execute a string of commands for CPU 10 and provide resulting data (where appropriate) thereto without interruption or interference from any of the other systems capable of sharing that device. Accordingly, CPU 10 would then be viewed as holding a "Reserve". Execution would continue in this fashion until CPU 10 issued a "Release" command over the channel, thereby relinquishing its reserve. In response to the Release command, control unit 40 would then permit any of the systems, i.e. CPU 10 or CPU 20, to once again issue a Reserve command over a corresponding path group, hold the reserve and therethrough gain sole access to the device, and so on.

Atomistic access to other shared devices, such as tape drives, specifically those typified by the IBM 3480 Magnetic Tape Drive Subsystem, is effectuated through use of "Assign" and "Unassign" commands that are issued by a CPU. Since these commands function in an analogous manner to that of the "Reserve" and "Release" commands, our present invention can easily be employed with these other devices as well. Consequently, for purposes of the following discussion, all such commands that provide a "Reserve/Release" type functionality (such as the "Assign/Unassign" commands) will be generically defined and referred to hereinafter as "Reserve/Release" commands with the ensuing device reservation being generated or relinquished by these commands being generically defined and hereinafter referred to as a "reserve". Inasmuch it will be readily apparent to anyone skilled in the art, given the teachings contained in the following discussion, how our invention is implemented with these other shared devices, the following discussion will only specifically address the implementation of our invention in connection with a shared DASD device.

Dynamic pathing also provides the ability, through a "Sense Path Group ID" command to read the status of any path group given its identifier (ID). In response to a system issuing this command over a path group, such as CPU 20 issuing this command over a subchannel extended through control unit 40, the control unit would return a message providing the identifier of its associated path group and state of that group. The state information would simply indicate whether the path group was currently reserved to a system (i.e. any system) or not. Unfortunately, if the reserve is held by a system other than the one that issued the command, such as CPU 10, the state information would not specify the specific system which currently holds the reserve.

Furthermore, dynamic pathing advantageously permits a CPU to first establish a connection to a shared device, e.g. device 60, through any path in a group and, then permits either the device or the CPU to disconnect from that path and later for both the CPU and the device to re-establish this connection but through the same or a different path in same group without the need for the CPU to relinquish and re-establish a reserve for the device. Additionally, inasmuch as individual channel paths can be deleted from and/or added to any path group at nearly any time by the MVS operating system, and specifically through the I/O Supervisor thereof, though using processes not relevant here, path groups are dynamically changeable.

To exert control over a subchannel, a control unit operates according to several pre-defined so-called "allegiance" rules. In essence, these rules collectively require that once a shared device, e.g. device 60, has been allocated to a program (particularly a so-called "channel" program) running on one system, e.g. CPU 10, and thus an allegiance has been established between this device and the system, that particular device becomes unavailable to any other such program running on any of the other systems. Accordingly, during a time period while CPU 10 is executing a channel program using device 60, CPU 20 is inhibited from gaining access to this device. As such, the "Reserve/Release" commands permit multiple channel programs, independently executing through CPUs 10 or 20, to atomically execute multiple I/O operations through a single shared device, e.g. device 60, by having the I/O Supervisor components of the MVS operating systems in these CPUs obtain, hold and then relinquish the reserve, as needed.

By way of background, allegiances can be of several types, of which "active" "working" and "reserve" allegiances are particularly relevant here. In essence, with respect to computer installation 5 shown in FIG. 1, an "active" allegiance occurs whenever a system, such as either CPU 10 or 20, is actively communicating through a subchannel to a device, here illustratively device 60. A "working" allegiance is said to be "extended" from a system to the device, i.e. this allegiance occurs, throughout the time during which active communication is occurring over a subchannel therebetween (in the case of an "active" allegiance) as well as during the time a command previously received over the path group is pending at the device. In the latter case, shared device 60 may be effectively disconnected from a CPU (so as to allow that CPU an opportunity to process other tasks unrelated to use of the device) but is awaiting an opportunity to reconnect through the path group and finish executing the command, such as for example while shared device 60 is appropriately positioning one of its heads in preparation for executing a data access command and then supplying accessed data to a requesting system. Oftentimes, both "working" and "active" allegiances are commonly and collectively referred to as "implicit" allegiances. A "reserve" allegiance occurs as soon as a Reserve command is issued by a system, either CPU 10 or 20, to gain access to device 60 and thereby inhibit any other path groups from doing so.

Historically speaking, "Reserve/Release" commands were first implemented such that only the system that issued a Reserve command to allocate a device, such as device 60, could issue a Release command to terminate the particular allocation. In prior multi-processing computer installations which relied on use of only a single dedicated path in lieu of each dynamic path group as used in installation 5, a portion of any such path could malfunction in such a manner that if a system had "reserved" a shared device over such a single path prior to a malfunction (failure condition), then an allegiance typically existed between that system and the device for the duration of the failure. Furthermore, the failure condition itself could even establish an allegiance over such a path even though immediately prior thereto no such allegiance existed through that path. Consequently, the control unit, when faced with the resulting allegiance, totally inhibited any other system from gaining access to the shared device for as long as the failure occurred. Inasmuch as the failure condition on the path also precluded the particular system which held the "reserve" from communicating with the shared device, neither that one nor any other of the systems could gain access to the device throughout the duration of this condition. Hence, a symptom of such a failure was a total inability of any of the systems to access the shared device over a prolonged period of time.

In an effort to adequately handle such failures, a "Unconditional Reserve" (U/R) command was implemented in these prior installations. This command, when issued by any system and carried over a single path to an associated control unit and executed at that unit, caused that unit to strip all the allegiances from all other such paths extended through that unit and establish a reserve allegiance over the specific path which carried the U/R command. As such, this permitted the system which issued the U/R command to gain complete control of the shared device.

Dynamic pathing, as employed in illustratively installation 5, significantly reduced the need to issue a U/R command and move a reserve in the event of a path failure. In this regard, by reserving a device through an entire path group rather than a single path then, if a path which was currently carrying communication failed, subsequent communication was simply routed to another path in the group without the need to move the reserve. However, in those instances where a U/R command was to be issued by a system over a path group, a reserve could be "stolen" by that "issuing" system and thus present a significant risk of violating the integrity of data stored on shared device 60. In this regard, within installation 5, any system, such as CPU 20, could issue a U/R command (as symbolized by arrow 38) to restore shared memory 60 at the time of a failure condition. Data integrity would be jeopardized whenever one system, such as CPU 10, held the reserve for shared device 60 but another system, such as CPU 20, issued the U/R command to, in effect, "steal" the reserve from the former system (as denoted by the crossed-out "R"). In this instance, the latter system, CPU 20, effectively had no knowledge at the time it "stole" the reserve of any updating operations then having been undertaken by CPU 10 up to the time of the failure condition. As such, CPU 20 could not invoke proper data recovery procedures and thus could well overwrite or otherwise destroy data updates then in process by CPU 10.

To avoid any such loss of data integrity resulting from issuance of a U/R command by a different system then the one that then held the reserve, the I/O Supervisor in the MVS Operating System executing within each CPU, here CPUs 10 and 20, was modified to request that an operator at that system first confirm that the U/R command was to be issued therefrom. However, prior to confirming issuance of this command, the operator was required to manually inhibit all "sharing" processes, determine which specific system held the reserve, and finally determine and invoke a proper data recovery procedure appropriate to that specific system and the updating operations that system was then undertaking through the shared device. Unfortunately, these tasks placed a significant burden on the operator and required the systems that where not going to issue a U/R command to quiesced for possibly a prolonged period of time and with a concomitant monetary cost, in terms of lost processing time, to the owner of the computer.

In modern multi-processing computer installations, such as installation 5 shown in FIG. 1, each CPU typically utilizes a timer(s) (not specifically shown in FIG. 1), operating through a so-called missing interrupt handler (MIH—also not specifically shown but discussed below in conjunction with FIGS. 6A and 6B), to produce an interrupt (generally referred to as a "'start pending' missing interrupt" or simply an "MIH interrupt") which can be used to detect a failure, such as in a shared device or path group, which would likely necessitate the issuance of a U/R command. In this regard, a timer in that CPU would be started by an I/O Supervisor within the MVS Operating System whenever that supervisor initiated an I/O command involving the shared device. The timer would either time out and generate an MIH interrupt once a default interval, typically 15 seconds or less, occurred or would be reset upon successful completion of the I/O command, whichever came first. While any such I/O command was pending, the CPU periodically tested for the occurrence of this interrupt as a symptom of a failure condition in a path group or shared device. Although a Sense Path Group ID command could be issued in response to an MIH interrupt, doing so did not identify the specific system, e.g. CPU 10 shown in FIG. 1, that then held the reserve thereby once again requiring the operator to quiesce those systems which were not going to issue a U/R command and then manually locate this specific system. In large multi-processing computer installations, the resulting loss of processing time proved to be extremely costly.

Furthermore, rather than resulting from merely a failure in either a shared device or path group, a series of MIH interrupts could be produced simply because the shared device was reserved over a prolonged period. In this instance, each such MIH interrupt would still require an operator response including manually querying each system in the installation. Moreover, since no allegiances then needed to be reset, any U/R command that was nevertheless issued would simply be unnecessary and needlessly consume effort by the operator as well as jeopardize data integrity.

To significantly reduce the number of falsely issued U/R commands that occurred in illustratively installation 5, control unit 40 permits both the "Set Path Group ID" (SPID) and "Sense Path Group ID" (SNID) commands to be executed for any path group regardless of whether that path group was reserved or not. Consequently, when a failure condition occurred, a Sense Path Group ID command would be automatically issued by the MVS Operating System to determine the state of a path group, i.e. whether that group was reserved to a system other than the one requesting issuance of a U/R command. If the resulting sense data returned by the SNID command revealed that a reserve was then extended through a path group, then this indicated a failure in that group which, in turn, required that error recovery be performed by only the particular system that held that reserve. Accordingly, the U/R command would not be issued and no corrective action would be invoked through the requesting system. However, where the resulting sense data revealed that the path group was not reserved anywhere, a reserve could still be extended through that group even after this data was returned. Hence, in these latter instances, operator intervention was still required to bring the entire installation down and then manually query each system to locate any one then holding the reserve.

While use of the SNID command greatly reduces the likelihood that the operator would falsely issue a U/R command, the operator is still burdened with the task of determining, through manually querying the affected systems, whether a U/R command should be issued.

Furthermore, each system, such as CPU 20, can also issue a "Reset Allegiance" (R/A) command, which when executed by a control unit, such as control unit 40, causes that unit to reset a working allegiance that had been established for the particular system which issued the command. In addition, when executed by the control unit, the R/A command returns a 32 byte result to the system which issued this command. Hence, if an MIH interrupt occurred, thereby indicating a failure condition exists in a path group or shared device, then the R/A command could be automatically used by that particular system, e.g. CPU 20, to successfully free the path group or device from its working allegiance. Unfortunately, the R/A command does not function whenever a reserve allegiance has been established. In this instance, use of the R/A command merely returns a 32 byte result from control unit 40 to CPU 20 which:

(a) specifies that a shared path or device is reserved, and
(b) includes a bit that simply indicates whether the shared path or device is reserved to either the system which issued the command or to another system but without specifically identifying the latter system. Consequently, if an MIH interrupt occurs while any system holds a reserve, such as CPU 10, the operator is still generally burdened with the onerous task of manually interrogating each system (or path) to locate the specific system then holding the reserve and thereafter effectuating proper corrective action.

Through our present invention, we have advantageously eliminated the need to have an operator manually interrogate each system to locate the reserve in the event of a failure condition. We accomplish this result by changing the sense data returned by execution of the R/A command to include the path group identifier (PGID) for the path group then holding the reserve. Each such PGID contains a unique identification of the CPU to which it is connected and through which it can a reserve. Advantageously, PGIDs are generated in an identical manner for all operating systems, e.g. both the MVS and VM operating systems, that share devices through the MVS operating system and are thus guaranteed to be substantially unique throughout the world. Hence, regardless of how many path groups a computer installation employs or the number of installations using dynamic pathing and existing throughout the world, and regardless of whether any of these installations are interconnected to each other or not, the resulting PGID contained in the sense data returned by the R/A command at any one installation, in all likelihood, will point to only one specific path group in the world. Accordingly, a message containing CPU identification data supplied by the PGID is then generated to an operator for display at an appropriate monitor to unambiguously define a CPU (or multiple guest MVS operating systems executing on a host VM operating system at any one CPU) then connected to a single path group and which is currently holding the reserve. This message can also be used to trigger an automatic recovery routine(s) appropriate to the one specific system then holding the reserve.

Furthermore, if our invention is to be used in a sysplex (i.e. a number of interconnected computer systems communicating through a cross system coupling facility, "XCF"), then, to relieve the sysplex operator of any tedium associated with having to convert the CPU identification data in the PGID returned by the R/A command, this PGID is then translated, through a table look-up operation into an IOS (I/O Supervisor) Record located in a so-called "Coupled Dataset", into a common system, i.e. "installation", name easily recognized by the operator. This dataset is maintained by the XCF and contains identification and other information regarding the state of each individual system in the sysplex and its interconnection with other such systems. In particular, the IOS record itself contains a table of all path group identifiers (primary PGIDs and, where applicable as described below, their corresponding alternate PGIDs) along with the common system name of each system in the sysplex to which each path group is connected. The Coupled Dataset is shared among and accessible, via the XCF, to any system within the sysplex. Consequently, any system in the sysplex which receives the path group identifier returned by the R/A command, then accesses the IOS record to determine the associated common system name. This common system name, where available, is then included in the message generated to the operator and/or used to trigger the appropriate automatic recovery routine(s).

B. Hardware Used in Implementing Our Inventive Technique

Figure 2:
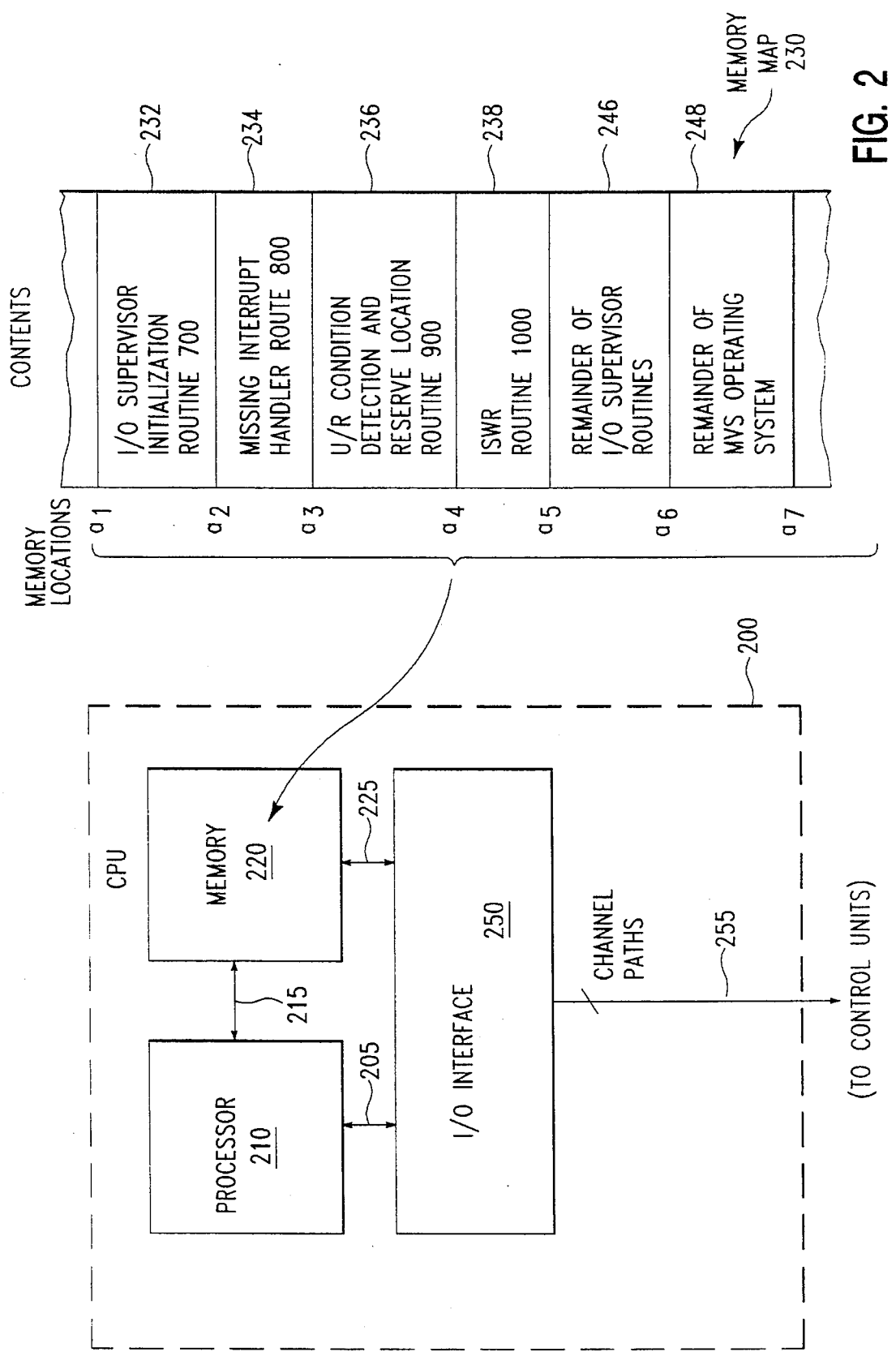
FIG. 2 shows a simplified block diagram of central processing unit (CPU) 200 and a typical simplified memory map of various software components stored within memory 220 and which would be incorporated into this unit in accordance with our present invention.

FIG. 2 shows a simplified block diagram of central processing unit (CPU) 200 and typical simplified memory map 230 of various software components stored within memory 220 and which would be incorporated into this unit in accordance with our present invention.

As depicted, CPU 200 contains processor 210, memory 220 and I/O interface 250. The processor and memory are themselves interconnected via links 215, with both of these components being connected to I/O interface 250 via respective links 205 and 225. I/O interface 250 is itself connected to channel paths 255. The specific implementation of each of the processor, the I/O interface and the memory are well known in the art and will not be discussed further. Moreover, only those details of memory 220 as pertains to the present invention will now be described.

Our invention is preferably implemented through a series of software routines that are embedded within the I/O Supervisor section of the MVS Operating System that executes on processor 210. This operating system, including our inventive software, is stored as a series of computer instructions, in object code, within a series of contiguous locations in memory 220. As depicted by memory map 230 which details the location of relevant information stored within memory 220, the entire MVS operating system is stored in locations $a_1$ through $a_7$. Inasmuch as the absolute address of each of these locations is not critical, these memory addresses are shown in relative terms. As described in detail below, the preferred software embodiment of our invention is formed by a series of routines, to wit: I/O Supervisor Initialization routine 700, Missing Interrupt Handler routine 800, U/R Condition Detection and Reserve Location routine 900 and Identify System with Reserve (ISWR) routine 1000. Though the relative location and ordering of each of these routines are also not critical, for purposes of illustration, routines 700, 800, 900 and 1000 are shown as residing in memory blocks 232, 234, 236 and 238 having relative starting addresses of $a_1$, $a_2$, $a_3$ and $a_4$, respectively. The remainder of the I/O Supervisor and MVS Operating System routines reside in memory blocks 246 and 248 between respective relative addresses $a_5$ and $a_6$, and $a_6$ and $a_7$, inclusive.

C. Path Group Identifier (PGID) format

Figure 3:
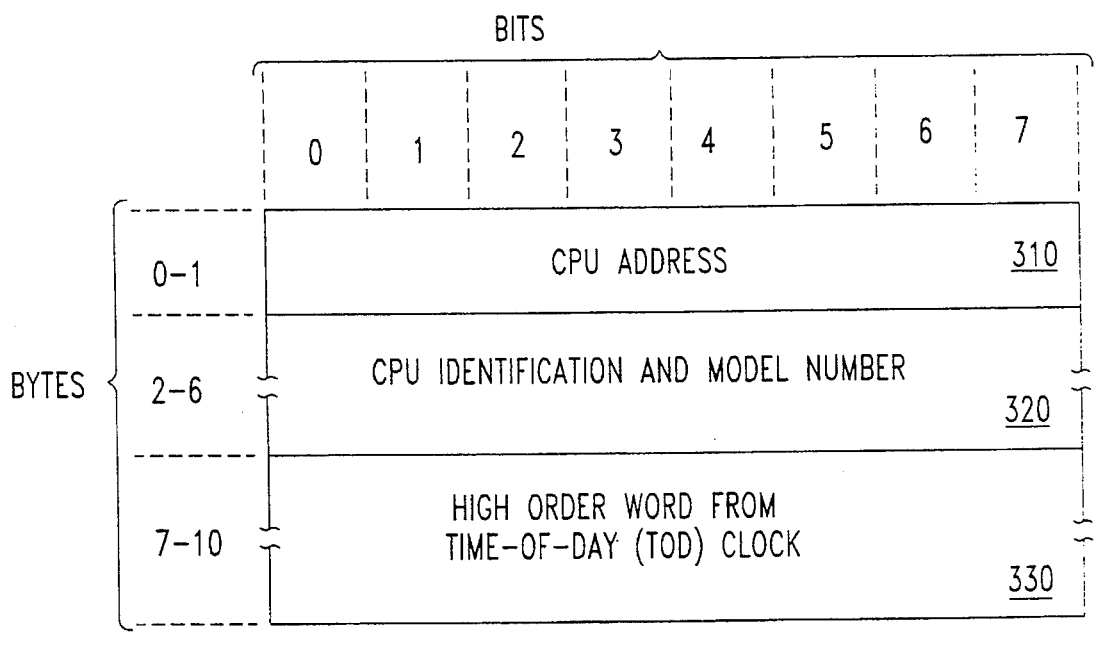
FIG. 3 diagrammatically shows constituent fields of a Path Group identifier (PGID)

FIG. 3 diagrammatically shows constituent fields of a Path Group Identifier (PGID). The PGID is created in the identical manner throughout the world for each and every device that is to be shared through the MVS Operating System regardless of the particular system that is to use that device. With certain exceptions not relevant here, every resulting PGID is unique throughout the world, thereby permitting our invention to uniquely identify a CPU then holding a reserve.

As depicted, for any path group, PGID 300 contains 11 bytes of 8-bit data arranged in three fields 310, 320 and 330.

The first two bytes, which collectively form field 310, contain an address of a CPU then connected to that group. This address is a two byte value returned by execution of a "Store CPU Address" (STAP) instruction, at that CPU.

The next five bytes, collectively forming field 320, contain a CPU identifier and model number. For a given CPU, both the identifier and the model number are provided by this CPU through execution of a "Store CPU ID" instruction thereat. The returned data includes a six hex digit CPU identification number and a four hex digit CPU Model number. The CPU identification number is of the form "a p dddd" where: "a" is either a logical or physical CPU address as returned by a STAP instruction but is not used to construct the PGID in view of the two byte address returned by this instruction. Value "p" is either: (a) a value manually supplied by an operator of the installation on a logical partition (LPAR) definition ("LPDEF") screen displayed by a program resource/systems manager routine ("PR/SM") as part of the MVS operating system, or (b) a digit indicating a plant of origin, i.e. which plant manufactured the particular CPU. The value "dddd" is a four digit value supplied by the manufacturer of the CPU. The model number is simply appended to the CPU serial number to form a ten hexadecimal digit CPU identification and model number field 320. This ten digit field provides a unique identification of the associated CPU. In the same computer installation, it is possible to have the same model and "dddd" values with only the plant of origin digit being different between two CPUs. Logical partitions guarantee that the "p" value is unique within an image which is one side of a physically partitioned computer. To enhance understanding, a physically partitioned computer is a single computer that has been effectively "split" in half and is running as two separate computers. Moreover, depending upon operator selection, CPUs can be dedicated to a single logical partition or shared among multiple logical partitions.

The last four bytes, collectively forming field 330, are a high order 32-bit word from a time-of-day (TOD) clock for the CPU, with time being referenced to Universal Coordinated (Greenwich Mean) Time. This further guarantees uniqueness of the resulting PGID.

D. Use of Our Invention within a Sysplex

FIG. 4 shows a simplified high level block diagram of illustratively two sysplex multi-processing computer installation 400 that utilizes a common shared device between the sysplexes and which could incorporate our present invention. As noted above, a sysplex is a number of interconnected computer systems communicating through a cross system coupling facility, XCF. As depicted, installation 400 consists of two sysplexes 405 and 455 (also denoted as Sysplex 1 and 2, respectively), and stand-alone system 490 all sharing DASD device 450. All the systems in this installation are executing the MVS Operating System. All the systems within the two sysplexes are sharing device 450 directly through their MVS Operating Systems. However, system 490 is sharing this device through a guest MVS operating system executing on top of a host VM operating system.

Inasmuch as sysplexes 1 and 2 are essentially identical (with the exception of shared DASD device 436 in Sysplex 1), the following discussion will describe Sysplex 2, i.e. sysplex 455, while providing reference numerals to corresponding components of Sysplex 1, i.e. sysplex 405, in parentheses. As depicted, sysplex 455 (405) illustratively contains individual CPUs 461, 462, 463, 464, 465 and 466 (411, 412, 413, 414, 415 and 416) interconnected through a conventional XCF (not specifically shown) and represented by links 471, 472, 473, 474, 475 and 476 (421, 422, 423, 424, 425, and 426). Through this facility, each CPU in sysplex 455 (405) has access to shared DASD device 482 (432) which, inter alia and to the extent relevant here, contains the Coupled Dataset for that sysplex. Within sysplex 455, CPUs 461, 462, 463, 464, 465 and 466 are assigned common system names of MVS1, MVS2, MVS3, MVS4, MVS5 and MVS6, respectively, and have shared access through path groups 4821, 4822, 4823, 4824, 4825 and 4826 to shared device 482; these path groups having respective PGIDs of C, D, E, F, G and H. In addition, CPUs MVS5 and MVS6 can also access shared DASD device 480 through path groups 4802 and 4801. As noted above, the same PGID is typically used for different paths that connect a common CPU to different devices. As such, both path groups 4801 and 4825 which connect to common CPU MVS5 carry the same PGID, i.e. G. Likewise, each of the path groups 4802 and 4826; 4824 and 4842; and 4823 and 4841 carry common PGIDs H, F and E, respectively. Similarly, within sysplex 405, though while not given specific lettered PGIDs, each of the path groups 4302 and 4326; 4301 and 4325; 4324 and 4342; and 4323 and 4341 carry the same respective PGIDs.

As a result of CPU initialization, sysplex initialization and partitioning, CPU specification data for each CPU on the sysplex is written into a system status record (not specifically shown) located in the Coupled Dataset associated with that sysplex. This specification data includes installation names of these CPUs and an indication as to whether the MVS operating system for each of these CPUs is actually a guest running on a host VM operating system thereat. For sysplex 455 (405), the Coupled Dataset typically resides on shared DASD device 482 (432) and is maintained by the XCF associated with each CPU in this sysplex.

With the above description of sysplex 455 in mind, FIG. 4A provides a table specifying a corresponding PGID for each CPU within this sysplex. As is evident from this table, each different CPU is assigned a different PGID, with the same PGID being used for all paths connected to that CPU. As discussed below in conjunction with FIG. 11, this table would be included within the IOS Record also situated within the Coupled Dataset for this sysplex. A similar table would be created and stored within shared DASD device 432, shown in FIG. 4, for sysplex 405. As described below in conjunction with the System Initialization routine 700 shown in FIG. 7, the PGIDs are entered into the IOS Record during initialization of the MVS operating system for each CPU in the sysplex.

Inasmuch as none of the CPUs in sysplex 455 (405), shown in FIG. 4, uses a guest MVS operating system executing on a host VM system, each such CPU only has a single PGID associated with it. In the event one of these operating systems were to execute as a guest on a host VM system, then the path group identifier created during subsequent initialization of the guest MVS system would likely be different from that previously created by the host VM system—though both identifiers would, as noted above, be created by the same algorithm. Consequently, in these situations, the host VM operating system would load and initialize before that of the guest MVS operating system. During its initialization, the host VM operating system would establish its own PGIDs to the shared devices. Thereafter, once the guest MVS operating system loads and initializes, this particular operating system will create its own PGIDs based, partly on the TOD clock, as described above. The guest MVS operating system will then consider the PGIDs which it creates to be "primary" PGIDs with the PGIDs previously created by the host VM operating system as "alternate" PGIDs (APGIDs). Subsequently, in response to a SNID command issued over a given path, the guest MVS operating system would first use the primary PGID and, if proven unsuccessful, would then use the APGID for this group. Hence, to accommodate such guest MVS operating systems, the primary and corresponding alternate PGIDs will be stored within the IOS Record for the CPU executing the host VM operating system. To differentiate between these two PGIDs in those situations which require it in the following discussion, a PGID created by an MVS operating system will be referred to as a "primary PGID". By including both the primary PGID and, where available, its corresponding APGID into the IOS Record, then regardless of which operating system was then executing on that particular CPU when a failure condition occurred, if that CPU then held a reserve, a look-up operation into the IOS Record given the path group identifier, then returned by an R/A command, would reveal all the names of the systems executing on that CPU.

Now, with installation 400 described thus far, assume that sysplexes 405 (Sysplex 1), sysplex 455 (Sysplex 2) and VM host system are all sharing dataset "SYS1.RACF" residing on shared DASD device 450. Furthermore, assume that CPU 462 (MVS2) failed while it was holding a reserve for this device. Another CPU in Sysplex 1, such as CPU 461 (MVS1) would then detect a "start pending" missing interrupt (i.e. an MIH interrupt) for device 450. In response, CPU 461 would then issue an R/A command, as symbolized by arrow 454. In accordance with the teachings of our invention, the control unit (not specifically shown) associated with device 450 would then return 32-byte sense data (shown specifically in FIG. 5 and discussed in detail below), and symbolized by arrow 456 in FIG. 4, to CPU 461. This sense data (labeled as "R/A Sense Data") contains the path group identifier identifying CPU 462 as then holding the reserve. The MVS operating system executing in CPU 461 would then undertake a table look-up operation into IOS Record to match the PGID contained in the sense data to a system name. If a match is not found, a message is generated by CPU 461 which merely indicates the serial number and model number of the CPU then holding the reserve. Alternatively, if a match is found, then this message also includes the common system name associated with CPU 462 and provided by the IOS Record. It is possible, though not with sysplexes 405 and 455, that multiple matches may be found. In this case, the message will contain multiple system names. This can occur if there is more than one MVS operating system is running as a guest under the same VM host, such as if the shared device is a "full pack mini". As such, multiple common system names may be identified by the look-up operation. If multiple matches result, then a system operator needs to use well-known VM operating system commands to specifically identify the one guest MVS operating system that owns the reserve. If the shared device is not a "full pack mini" or the like, then this device is likely to be a dedicated device and can only be used by one VM guest at a time. Consequently, given this limitation, it is relatively simple for an operator to identify the correct operating system then holding the reserve in a VM environment. Similarly, since device 482 (432), as well as devices 480 and 484 (430 and 434), lies totally within sysplex 455 (405) and is just shared by the CPUs therein, then if any CPU in this sysplex were to fail while holding a reserve for any of these particular shared devices, that particular CPU would be fully identified by its common system name to a sysplex operator.

Furthermore, whenever an MVS operating system is running in a logical partition at a CPU, the second digit ("p"), as described above, of the CPU serial number contained in the PGID (or APGID) identifies the logical partition for the CPU and hence the particular operating system thereat then owning the reserve. Consequently, by translating the primary PGID or APGID into a common system name, the operator, for purposes of locating a reserve, is relieved of having to know which operating system is running in which logical partition at any CPU. Hence, if MVS1 were actually executing in a particular logical partition at a CPU, translation through the IOS Record would identify this particular operating system at this CPU.

Alternatively, if CPU 490 (PGID B) were to fail while holding a reserve for the device 450, then, this CPU executing an guest MVS system on a host VM system but not a member of any sysplex, would simply be identified by its CPU serial number to both sysplexes. The operator at each sysplex would then need to translate the CPU serial number into a common system name.

E. Sense Data Returned by a Reset Allegiance (R/A) Command

Figure 5:
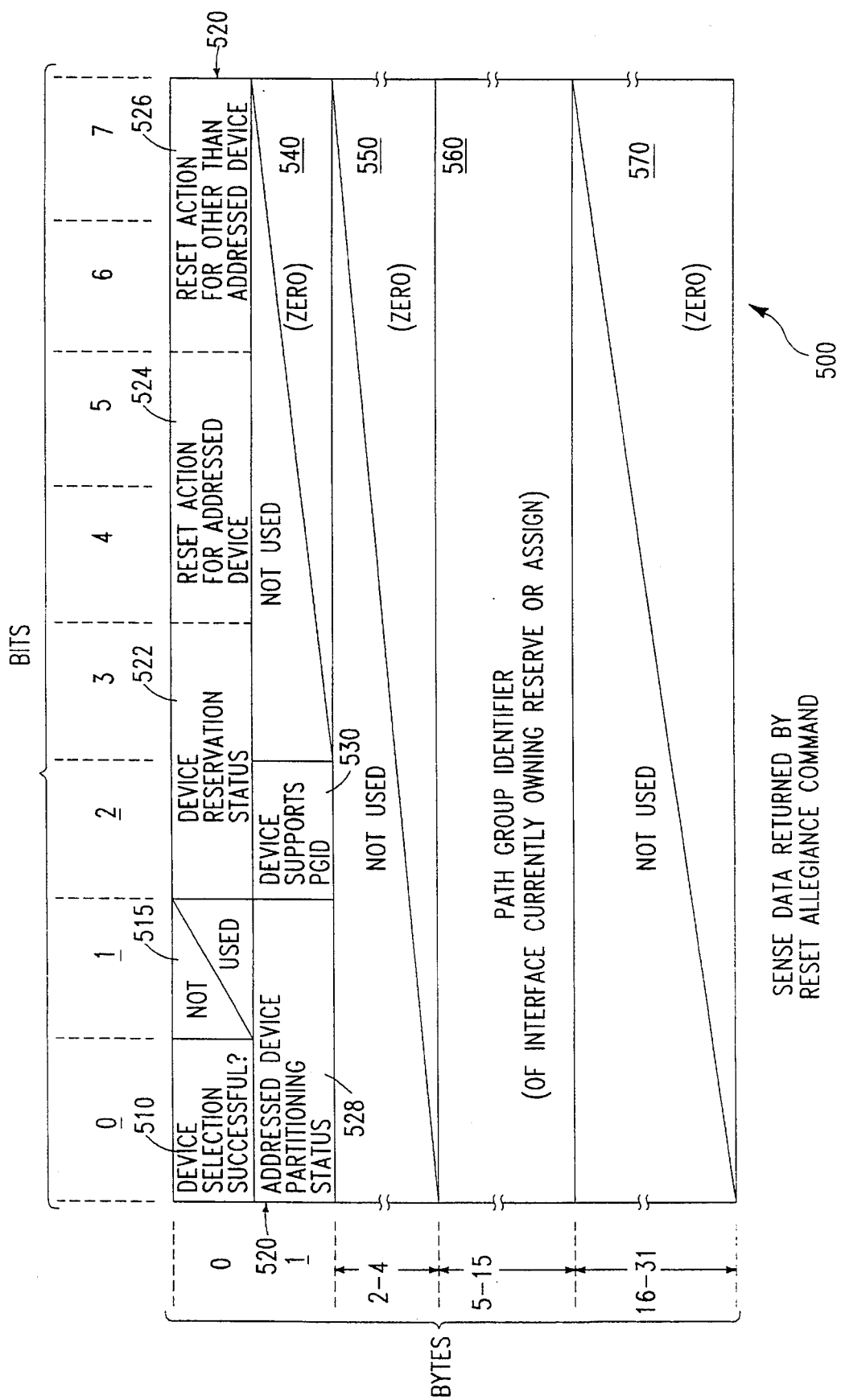
FIG. 5 diagrammatically shows constituent fields of sense data (32 bytes), as taught by our invention, and returned from a control unit through execution of a Reset Allegiance command.

FIG. 5 diagrammatically shows constituent fields of sense data (32 bytes), as taught by our invention, and returned from a control unit through execution of an R/A command for an addressed device. The binary operation code (opcode) for the R/A command is "44" (hex) and is defined for all devices that support dynamic pathing.

As shown, sense data 500 is formed of 32 8-bit bytes broken into separate fields 510, 515, 520, 530, 540, 550, 560 and 570. One-bit field 515 (bit 1 in byte 0 in data 500), three-byte field 550 (bits 3–7 in byte 1) and sixteen-byte field 570 (bytes 16–31) are all "zeroed" and not used.

One-bit field 510 (bit 0 in byte 0 of data 500) specifies whether an addressed device that received this command was successfully selected as a result. Device selection can be unsuccessful if the device is reserved to another interface or group of interfaces, a malfunction occurred that precluded the device from being selected, or the device is manually or dynamically partitioned. Except in the case of such a malfunction, meaningful sense information is returned by the R/A command. The malfunction, when it occurs, results in abnormal termination of the R/A command and a "unit-check-status" is returned.

Eight-bit field 520, comprised of sub-fields 522, 524, 526 and 528, defines device status and reset actions taken as a result of the R/A command. In particular, two-bit subfield 522 (bits 2 and 3 in byte 0) defines the reservation status of the addressed device as follows:

| Value of bits 522 | Description |
| --- | --- |
| 00 | The addressed device is not reserved (or assigned). |
| 01 | The addressed device is reserved (or assigned) to another I/O interface or group of interfaces than the one which carried the R/A command. |
| 10 | The addressed device is reserved (or assigned) to the I/O interface or group of interfaces that carried the present R/A command. |
| 11 | Not used. |

Two-bit subfield 524 (bits 4 and 5 in byte 0) specifies, as follows, what, if any, reset action occurred for the addressed device:

| Value of bits 524 | Description |
| --- | --- |
| 00 | No allegiance was reset for the addressed device. Either no allegiance then existed or the allegiance was not reset because the device was then reserved (or assigned) to another I/O interface or group of interfaces than that which carried the R/A command. |
| 01 | An implicit allegiance was reset for the addressed device. |
| 10 | A contingent allegiance was reset for the addressed device. |
| 11 | Not used. |

Though not particularly relevant here, a contingent allegiance is established by a control unit whenever a subchannel accepts a status byte, from a control unit, where the status byte contains a "unit check" or "attention" that is detailed by sense information. Under normal circumstances, establishing a contingent allegiance will have no effect on system operation. The operating system will simply issue a sense command to clear the contingent allegiance and obtain the sense information for recording and interrogation.

Two-bit field 526 (bits 6 and 7 in byte 0) specifies, as follows, what, if any, reset action occurred for any device other than the addressed device:

| Value of bits 526 | Description |
| --- | --- |
| 00 | No allegiance was reset for another device(s). |
| 01 | An implicit allegiance was reset for another device(s). In order to select the addressed device, an implicit allegiance for one or more other devices was reset. |
| 10 | A contingent allegiance was reset for another device(s). In order to select the addressed device, a contingent allegiance for one or more other devices was reset. |
| 11 | Implicit and contingent allegiances were reset for another device(s). In order to select the addressed device, an implicit allegiance and a contingent allegiance for one or more other devices were reset. |

Lastly, two-bit subfield 528 (bits 0 and 1 in byte 1) define the partitioning status of the addressed device, as follows:

| Value of bits 528 | Description |
| --- | --- |
| 00 | The addressed device is implicitly available. |
| 01 | The addressed device is disabled. |
| 10 | The addressed device is explicitly enabled. |
| 11 | Not used. |

Single-bit field 530 (bit 2 in byte 1) specifies whether the control unit in the addressed device supports the function of returning a path group identifier in response to an R/A command, as follows:

| Value of bit 530 | Description |
| --- | --- |
| 1 | Return of the path group identifier is supported. Hence, the control unit for the addressed device will return an 11-byte path group identifier value in bytes 5–15 if this device is reserved to an I/O interface that contains a valid path group identifier. |
| 0 | The control unit for the addressed device will not store a path group identifier value in bytes 5–15, even if the addressed device is reserved to an I/O interface that contains a valid path group identifier. |

Lastly, if the control unit for the addressed device supports return of a path group identifier, then eleven-byte field 560 (bytes 5–15 in data 500) contain a path group identifier value returned by this control unit. The format of the path group identifier is that shown in FIG. 3 and discussed in detail above. While only one system can be reserved at a time, multiple systems can be "assigned" (through use of the "Assign" command, as noted above) through corresponding path groups to one device. Hence, if the addressed device is assigned to multiple path groups, then the path group identifier for any one of these groups is returned. In any event, if the I/O interface does not contain a path group identifier, then the returned path group identifier is all zeroes. A non-zero path group identifier is returned in the event that the I/O interface is operating in an ungrouped state (i.e. a path group having only one channel path).

F. Software Used in Implementing Our Inventive Technique

1. Software Routines

Our inventive software forms a part of and executes within the I/O Supervisor of every MVS operating system for each CPU that is accessing a single shared device. However, for purposes of illustration, the software will be discussed in terms of that incorporated within the MVS operating system executing within each CPU that forms a sysplex, such as CPU 461 shown in FIG. 4. Suitable modifications that will be readily apparent to anyone skilled in the art can be made to this software to easily adapt it to other multi-processor architectures, such as illustratively non-sysplex architectures.

With this in mind, the description of the software will first proceed with a discussion of the information flow that occurs among various inventive software routines that are used in implementing our present invention in CPU 461 as well as related software components of the MVS operating system in that CPU which interact with these routines. Thereafter, the description will specifically address each of our inventive routines.

FIGS. 6A and 6B collectively depict the information flow that occurs among our inventive routines and related software components of the MVS operating system all of which executes within illustratively CPU 461 shown in FIG. 4. The correct alignment of the drawing sheets for FIGS. 6A and 6B is depicted in FIG. 6. Although these routines function in the same manner with all path groups emanating from CPU 461, for simplification, we will only describe the operation of these routines in connection with one illustrative path group, i.e. group 680, and a "far-end" control unit and an accompanying shared device (both of which are not shown) connected to this group. Also, for simplification, we will also assume that only one system, i.e. a single MVS operating system, is executing on CPU 461.

As depicted, our inventive routines are comprised of I/O Supervisor Initialization routine 700, MIH Handler routine 800, U/R Condition and Reserve Location routine 900 and Identify System with Reserve (ISWR) routine 1000, all situated within I/O Supervisor 610 that forms a component of MVS operating system 600. Inasmuch as the MVS operating system and the I/O Supervisor (apart from our inventive routines) are both well-known in the art, only those sections of each of these two system programs that are germane to our invention will be specifically discussed. In this regard, our inventive software also interacts with I/O Request Queue 630 and Hardware I/O Configuration routine 640, all of which also form a part of the I/O Supervisor. Our inventive routines also interact with cross system coupling facility (XCF) 615, software timers 650, program supervisor 660 and automatic recovery routine 670, all of which are well-known and form part of the MVS operating system but are not contained within the I/O Supervisor. In addition, our inventive software utilizes IOS Record 1100 situated within Coupled Dataset 620. As shown, XCF 615 also resides within MVS operating system 600 to permit CPU 461 to access and update sysplex system files, such as the Coupled Dataset, stored within shared device 482.

Operationally speaking, during initialization of CPU 461, I/O Supervisor Initialization routine 700 is executed. This routine (discussed in detail below in connection with FIG. 7) establishes the path group identifier for each path group accessible through the single MVS operating system executing on CPU 461, and writes these values into the corresponding control units. Thereafter, routine 700 also writes appropriate entries into IOS Record 1100 (shown in FIGS. 6A and 6B), through line 623, XCF 615 and path group 4821, to form a correspondence between this CPU and each PGID for each corresponding path group connected to this CPU. No APGIDs are used with this particular CPU since it is not executing a guest MVS operating system on a host VM system. These operations, for path group 680, specifically involve issuing a "Set Path ID" (SPID) command, as symbolized by line 681, over each path that is to be defined to the shared device to form a path group. This command contains the PGID for every such path in group 680. Upon execution of the SPID command by a far-end control unit (not specifically shown), this unit then identifies each such path in group 680 and establishes an internal correspondence therefor. Thereafter, CPU 461 periodically tests for the occurrence of an MIH interrupt as a symptom of a failure condition in path group 462 or a shared device connected thereto (also not specifically shown). In this regard, whenever I/O Supervisor 610 initiates an I/O operation involving a shared device, the I/O Supervisor issues an instruction, symbolized by line 653 to start one of timers 650. This timer would either then time out and generate an MIH interrupt once a default interval, typically 15 seconds or less, occurred or be reset by the I/O Supervisor (through a line not shown) upon successful completion of the command, whichever came first. In the event the timer timed out, an MIH interrupt would be generated, as symbolized by line 657. This interrupt, when it occurs, invokes MIH Handler routine 800.

MIH Handler routine 800, when executed, searches a queue of then pending I/O requests, as symbolized by line 635 emanating from I/O queue 630, to determine whether an I/O instruction involving a shared device was then pending and hence an MIH interrupt, in fact, did occur. If an MIH interrupt did occur, then routine 800 performs MIH recovery by first issuing a command, symbolized by line 685, over path group 680 to clear the sub-channel. Also as part of this recovery, routine 800 issues a message, as symbolized by line 639, to program supervisor 660 within the MVS operating system to terminate execution of the current channel program using the shared device through path 680. Once these operations have occurred, MIH routine 800 issues a message, as symbolized by line 638, to Hardware I/O Configuration routines 640 to initiate an asynchronous device recovery procedure. This procedure first involves issuance of appropriate messages, as symbolized by line 683, over path group 680 (as well as all the other path groups) to re-establish this path group (as well as all the others for CPU 461). Thereafter, as part of this procedure, routine 800 invokes, as symbolized by line 637, U/R Condition Detection and Reserve Location routine 900.

Routine 900, when executed, first issues a "Sense Path Group ID" command, as symbolized by line 687, over path group 680 to determine if the shared device reserved through any path group. Thereafter, based upon sense data, as symbolized by line 689, returned by the control unit for this device, routine 900 determines whether a reserve is actually being held for the shared device and, if so, whether the control unit in this device supports the R/A command and returns a path group identifier. If the control unit supports the R/A command, then, as symbolized by line 691, routine 900 will issue this command over path group 680 to this control unit. Based upon the sense data, as symbolized by line 693 and described above in conjunction with FIG. 5, returned by the control unit to the R/A command, routine 900 will pass the R/A sense data to ISWR routine 1000 and invoke this latter routine, both operations being collectively symbolized by line 625 shown in FIGS. 6A and 6B, to translate the returned path group identifier contained in this sense data into a common system name. Alternatively, if routine 900 concludes that the control unit does not support the R/A command, as defined above, then routine 900 will issue a U/R command, as symbolized by line 695, over path group 680 to the control unit.

ISWR routine 1000, when executed, accesses the IOS Record situated on shared device 482, through line 627, XCF 615 and path group 4821, and then searches through this record to locate an entry in the IOS Record that contains the path group identifier supplied in the R/A sense data. Inasmuch as path group 4821 terminates at shared device 482, the remainder of the linkage, from path group 4821, to the IOS Record is shown as a dotted line. Now, if such an entry is located in the IOS Record, then routine 1000 produces a message that specifies the particular CPU which is then holding the reserve. This message contains the number of the device that is currently reserved, the serial number of this CPU, and, if present in this entry, the common system name of this CPU (such as MVS1). This message is then routed, as symbolized by line 697, to an operator monitor associated with CPU 461 for display thereat. In response to this message, the operator can launch an appropriate procedure(s) to recover the shared device and return this device to active service. In addition, should MVS operating system 600 contain automatic recovery routines 670 (shown in dotted lines) for this device, then this message can be routed, as symbolized by dotted line 675, to these routines to automatically trigger these routines in order to properly recover this device and return it to active service.

We will now proceed to address each of our inventive routines 700, 800, 900 and 1000 in seriatim. Inasmuch as, from the following description, anyone skilled in the art will be readily able to develop appropriate high level and/or object (machine) code to implement each of our inventive routines in an accompanying machine environment (with the specific programming therefor being machine dependent to a certain extent), each of these routines will only be specifically described at a high functional level.

In particular, FIG. 7 shows a high level flowchart of routine 700, depicted in FIGS. 6A and 6B, for performing system initialization of an Input/Output (I/O) Supervisor component of the MVS operating system. As noted above, this routine establishes the appropriate path group identifier for each path group connected to the CPU executing this routine, and writes these identifiers into the corresponding control units. Thereafter, this routine also writes an entry into IOS Record 1100 to form a correspondence between this particular CPU and the path group identifiers (both the primary PGID and, where appropriate, the APGID) for each corresponding path group connected thereto.

Specifically, upon entry into routine 700, execution first proceeds to block 710. This block, when executed, creates the path group identifier values, in the manner described above, for each path group connected to the particular CPU which is executing this routine. Thereafter, block 720 executes to initialize all the shared devices (specifically the control units used therewith) that operate with dynamic pathing. Routine 700 accomplishes this by issuing a SPID command for each path group accessible by each system running on this CPU. If only one such system, such as a single MVS operating system, is executing on this CPU, then only the path groups for this system will be established, and so forth for other such CPUs. For each of these groups, the same "Set Path Group ID" command, i.e. containing the path group identifier for that group, is transmitted down each channel path in that group. As a result of receiving the same path group identifier value for each channel path in every group accessible through this system at this CPU, the control unit establishes an internal correspondence between each channel path in each such path group and the particular CPU to which each of these path groups and channel paths is connected. Thereafter, execution proceeds to block 730. If the MVS operating system executing on the present CPU is actually a guest MVS system running on top of a host VM operating system, as described above, then block 730 establishes the path group identifier created by the MVS system as the primary PGID and that previously created by the VM operating system as an APGID for each path group accessible through this guest MVS operating system. As noted above, the primary path group identifier for each such path group accessible by the guest MVS operating system would have been created subsequently to the path group identifier for the same group, now the APGID, created during initialization of the VM operating system.

Once block 730 has fully executed, execution proceeds to block 740 which, through the XCF, reads IOS Record 1100 (which will be discussed in detail below in conjunction with FIG. 11) from the Coupled Dataset. Thereafter, block 750 executes to update the IOS Record by writing entries into this record to form an internal correspondence between each CPU and the primary PGID (and where applicable, the APGIDs) of each path group accessible thereby. Once all the entries have been written, block 760 is executed to appropriately write the updated IOS Record into the Coupled Dataset (CDS) accordingly. Once these operations have fully occurred, execution exits from routine 700.

FIG. 8 shows a high level flowchart of MVS Missing Interrupt Handler routine 800, also depicted in FIGS. 6A and 6B. As noted above, routine 800 performs several operations to handle an MIH interrupt and recover a shared device then being reserved. Routine 800 is executed periodically, typically once every second.

Specifically, upon entry into routine 800, execution proceeds to block 810. This block, when executed, examines all pending I/O requests in an I/O Request Queue (e.g. queue 630 shown in FIGS. 6A and 6B) to locate any requests that have not been completed within an MIH interval, typically 15 seconds or less, as noted above, for a shared DASD). Execution then proceeds to decision block 820 to determine whether an MIH interrupt in fact occurred. In the event such an interrupt did not occur, then execution merely exits from routine 800 via "NO" path 823 emanating from this decision block. Alternatively, if an MIH interrupt did occur, then execution proceeds, via "YES" path 827 emanating from decision block 820, to block 830. This latter block, when executed, performs MIH recovery. To do so, block 830 first issues a command, over the particular path group for which an current MIH interrupt is associated and through which a device is reserved, to clear the sub-channel associated with that group. Thereafter, routine 800 issues a message to a program supervisor within the MVS operating system to terminate execution of the current channel program using the reserved device through this particular path group. Once these operations have been accomplished, execution proceeds to block 840. This block simply issues an MIH occurrence message and then logs this message into an appropriate system log for future reference.

After block 840 has fully executed, execution proceeds to block 850 to perform asynchronous recovery of the shared device. This recovery, as discussed above, involves first re-establishing (i.e. re-validating) all path groups for all the devices that operate through dynamic pathing (i.e. so-called dynamic path selection, "DPS" devices) that are accessible through each system executing on the present CPU. Thereafter, block 850 invokes U/R Condition Detection and Reserve Location routine 900 to determine whether a condition currently exists that would justify the issuance of a U/R command and to so issue the command accordingly, or locate the current CPU then holding the reserve. Once block 850 has fully executed, execution exits from routine 800.

FIG. 9 shows a high level flowchart of Unconditional Reserve (U/R) Condition Detection and Reserve Location routine 900, also depicted in FIGS. 6A and 6B. As noted above, this routine performs several operations aimed at issuing a U/R command, if conditions warrant, or, if a control unit through which a reserve is then held supports return of a path group identifier through the R/A command as defined above, locating the particular CPU then holding the reserve.

Specifically, upon entry into this routine, block 910 is first executed to issue a "Sense Path Group ID" command over the path group to the control unit for the shared device which is then reserved. Execution then passes to decision block 920 which, determines, in response to the sense data received from this control unit, whether the sense command was successful or not, i.e. whether a reserve has been extended through any path group for the shared device. If no such reserve has been extended through any path group—i.e. no reserve current exists for the device, then no failure has occurred (i.e. no error condition has been detected). As such, MIH processing terminates with execution exiting from routine 900, via "YES" path 923 emanating from decision block 920. Alternatively, if a reserve has been extended through any path group, then execution proceeds, via "NO" path 927, to decision block 930.

Decision block 930, when executed, determines whether the control unit for the shared device connected to this path group supports the R/A command. In the event that the control unit does not provide this support, then execution proceeds, via "NO" path 937 emanating from decision block 930, to block 960. This latter block, when executed, issues the U/R command to the control unit to recover the shared device. The shared device is unavailable until after the U/R command has been issued and then appropriately processed by the control unit associated with this device. Once this command has been issued, execution exits from routine 900.

Alternatively, if the control unit appropriately supports the R/A command, then execution proceeds to block 940, via "YES" path 933 emanating from decision block 930. Block 940, when executed, issues an R/A command to the control unit thereby freeing the shared device from its current working allegiance. Rather than issuing the R/A command, as discussed above, only in the event a reserve then exists, this command could also be issued regardless of whether a reserve is then outstanding or not. In any event, execution then proceeds to decision block 950 which determines from the R/A sense data, and particularly the path group identifier contained therein, whether the device is reserved to a system executing on the present CPU, i.e. the CPU that is executing this routine, or another CPU. If the device is reserved to the present CPU, then, as such, the location of the reserve, at least in terms of its associated CPU, is known. Accordingly, in this instance, execution exits from routine 900, via "NO" path 953 emanating from decision block 950. However, if a different CPU is holding the reserve, then decision block 950 routes execution, via "YES" path 957, to block 970. This latter block passes the R/A sense data to ISWR routine 1000 and invokes this routine to identify the specific CPU which is then holding the reserve. Once block 970 has fully executed, execution exits from routine 900.

Lastly, FIG. 10 shows a high level flowchart of Identify System with Reserve (ISWR) routine 1000, also depicted in FIGS. 6A and 6B. As noted above, this routine, through use of the R/A sense data and the IOS Record, identifies the CPU then holding the reserve.

Upon entry into routine 1000, execution first proceeds to block 1010. This block, when executed, accesses, through the XCF, and reads the IOS Record residing in the Coupled Dataset. Thereafter, block 1020 is executed to search through this record to locate an entry therein that contains either a primary PGID or an APGID that matches the path group identifier supplied in the R/A sense data. Once this operation has been completed, execution proceeds from block 1020 to block 1030. This latter block, when executed, produces a message that specifies the particular CPU which is then holding the reserve. This CPU is identified from the primary PGID or the APGID contained in the matching entry. This message contains the number of the device that is currently reserved, the serial number of this CPU, and, if present in this entry, the common system name of this CPU. This message is then routed to an operator monitor associated with the present CPU for display thereat and/or to appropriate automatic recovery routines in order to trigger automatic recovery of the shared device.

2. IOS Record

FIG. 11 diagrammatically shows illustrative IOS Record 1100 contained within Coupled Dataset 620 depicted in FIGS. 6A and 6B. A separate IOS Record exists for each sysplex.

As shown, illustrative IOS Record 1100 provides a table of entries, of which entries 1110, 1120, 1130, 1140 and 1150 are illustrative. Each of these entries specifies in: a "SYSTEM NAME" field, the common installation name, if known, of an associated system, e.g. an operating system, executing in a sysplex; an "LPAR Y/N" field, whether that system resides within a logical partition at an associated CPU; and primary PGID and APGID fields, the primary and alternate path group identifiers through which that system can hold a reserve. One entry exists for each system that executes every CPU in the sysplex.

The first six entries, of which entries 1110, 1120, 1130 and 1140 are expressly shown, correspond to the systems in Sysplex 455 described above and shown in FIG. 4. As an example, since each CPU in this sysplex is executing only one operating system which does not reside on a logical partition, then each of these entries, of which entry 1110 is illustrative, will provide the common system name, e.g. MVS1, an indication ("NO") that this system does not reside on a logical partition and the PGID associated with each of these entries ("abcd1234" for system MVS1—this PGID is shown as "C" in FIG. 4, and so on for the other PGIDs). Inasmuch as none of these systems is a guest MVS system executing on a VM host, then the APGID field for each of these entries will contain all zeroes. Although, in practice and as discussed above, each path group identifier is formed of 11 bytes (i.e. 22 hex digits), to simplify the drawing, only eight such digits are shown for each primary PGID and APGID.

Now in the event that one of the systems is a guest MVS system operating on top of host VM system, then the corresponding entry, of which entry 1150 is typical, would have both a primary PGID and an alternate PGID. As discussed above, the primary PGID for any one path group would be created by the MVS operating system; while its APGID would be the path group identifier previously created by the VM operating system. In the case of entry 1150, identifier "efef8791" has been initially created as an identifier for a path group by host operating system VM2 during its initialization. Subsequently for this same path group, during initialization of a guest MVS operating system executing on top of operating system VM2, the MVS system relegated identifier "efef8791" as an APGID for this group and then created "cccd5678" as a primary PGID for this particular group. As such, entry 1150 contains both a PGID and an APGID which, while numerically different but resulting from identical algorithms, still point to the same system, i.e. VM2.

While our invention has been described in terms of translating the path group identifier returned by the R/A sense data through a Coupled Dataset in a sysplex environment, those skilled in the art will readily appreciate that since our invention can be utilized in nearly any multi-processing environment, the particular method of translating the path group identifier (and the accompanying data structures used for this translation) will be predicated on the particular environment and will likely vary widely from one such environment to the next. This translation is certainly not limited to a table look-up operation, though, in many installations, this method of translation is likely to be the most efficient.

Although a single preferred embodiment which incorporates the teachings of our present invention has been shown and described in detail herein, those skilled in the art can readily devise many other varied embodiments that still incorporate these teachings.

We claim:

1. In a multi-processing environment having a plurality of systems organized as a sysplex such that said systems communicate with each other through a cross system coupling facility (XCF) and connected through a corresponding plurality of links to a control unit associated with a device and each of said links comprises a path group, wherein each of said systems gains and relinquishes access to said device by issuing a "Reserve" or "Release" command, respectively, over a corresponding one of said links to the control unit, a method of locating a particular one of the systems then holding a "reserve" for said device, said method comprising the steps of:

determining, through any one of said systems, whether a pre-defined command previously sent to the device by said one system has successfully completed;

issuing a reset allegiance (R/A) command by said any one system and over a corresponding one of said links connected to said one system in the event said pre-defined command has not successfully completed;

providing, by said control unit and over said corresponding one link and in response to said R/A command, sense data comprising an identification of a particular one of said links through which said particular system holds the reserve for the device, said identification comprising an identifier for further identifying said particular one of the systems as being connected to said particular one link;

translating the identifier into a common system name wherein said translating step comprises the steps of:

searching through a record situated within a Coupled Dataset accessible by each of said systems through the XCF, to locate an entry containing said path group identifier contained in the sense data returned by said R/A command; and reading a common system name in said entry as the particular system then holding the reserve; and generating, in said any one system and in response to the identifier in the sense data, a message incorporating said common system name for specifying the particular system then holding the reserve, wherein said any one system is a host operating system executing on a central processing unit, a guest operating system operating on a central processing unit, or the central processing unit itself with the particular system being one of a plurality of central processing units.

2. The method in claim 1 wherein said particular system is a guest MVS operating system executing on top of a host VM operating system at a common CPU, said searching step comprising the step of locating said entry in said record as being an entry containing either a primary path group identifier or an alternate path group identifier that matches the path group identifier supplied by the sense data returned by the R/A command.

3. The method in claim 2 wherein said establishing step further comprises the steps of:

in said one system:

establishing the primary path group identifier in an associated entry as being the path group identifier created by said MVS operating system during initialization thereof;

establishing the alternate path group identifier in said associated entry as being the path group identifier created by said VM operating system during initialization thereof, the initialization of the VM operating system occurring prior to the initialization of the MVS operating system; and storing in said entry a common system name of one of said plurality of systems associated with said primary and alternate path group identifiers.

\* \* \* \* \*